United States Patent
Harrison et al.

(10) Patent No.: US 9,720,228 B2
(45) Date of Patent: Aug. 1, 2017

(54) COLLIMATING DISPLAY WITH PIXEL LENSES

(75) Inventors: Gregory A. Harrison, Oviedo, FL (US); David Alan Smith, Cary, NC (US)

(73) Assignee: Lockheed Martin Corporation, Bethesda, MD (US)

(*) Notice: Subject to any disclaimer, the term of this patent is extended or adjusted under 35 U.S.C. 154(b) by 1135 days.

(21) Appl. No.: 13/327,217

(22) Filed: Dec. 15, 2011

(65) Prior Publication Data
US 2012/0154920 A1    Jun. 21, 2012

Related U.S. Application Data

(60) Provisional application No. 61/424,162, filed on Dec. 17, 2010, provisional application No. 61/424,166, (Continued)

(51) Int. Cl.
*G02B 27/10*    (2006.01)
*G02B 27/01*    (2006.01)
*G02B 3/00*     (2006.01)

(52) U.S. Cl.
CPC ......... *G02B 27/017* (2013.01); *G02B 3/0056* (2013.01); *G02B 2027/0147* (2013.01)

(58) Field of Classification Search
CPC .......... G02B 2027/0147; G02B 27/017; G02B 3/0056; G02B 27/0101; G02B 27/01;
(Continued)

(56) References Cited

U.S. PATENT DOCUMENTS

| | | | |
|---|---|---|---|
| 3,880,509 A | 4/1975 | Herndon | |
| 4,026,641 A * | 5/1977 | Bosserman | ............. G02B 5/10 359/869 |

(Continued)

FOREIGN PATENT DOCUMENTS

| CA | 2750287 A1 | 11/2011 |
|---|---|---|
| CA | 2750287 C | 7/2012 |

(Continued)

OTHER PUBLICATIONS

U.S. Appl. No. 13/211,372, filed Aug. 17, 2011.*
(Continued)

*Primary Examiner* — Scott J Sugarman
*Assistant Examiner* — Vipin Patel
(74) *Attorney, Agent, or Firm* — Withrow & Terranova, PLLC

(57) ABSTRACT

A display assembly (515) includes: (a) an image display system (10) which includes an array of pixels (120) and (b) an array of pixel lenses (115). The array of pixel lenses has each lens positioned to collimate or substantially collimate light from a corresponding single pixel of the array of pixels. The display assembly (515) is used in a head-mounted display apparatus (500) which includes a frame (510) to support the display assembly (515) a desired distance from a user's eyes. The head-mounted display apparatus may also include a beam splitter (520) to reflect images from the display assembly (515) to the user's eyes. The head-mounted display apparatus may provide a wide field of view to the user and may be of the augmented-reality or immersive type.

16 Claims, 18 Drawing Sheets

Related U.S. Application Data filed on Dec. 17, 2010, provisional application No. 61/423,934, filed on Dec. 16, 2010.

(58) Field of Classification Search
CPC .... G02B 2027/0118; G02B 2027/0187; G02B 27/0172; G02B 2027/0132; G02B 27/0176; G09G 3/003; H04N 13/0497; H04N 13/0285
USPC .......................................... 359/629–633, 619
See application file for complete search history.

(56) References Cited

U.S. PATENT DOCUMENTS

| | | |
|---|---|---|
| 4,176,468 A | 12/1979 | Marty, Jr. |
| 4,406,532 A | 9/1983 | Howlett |
| 5,184,250 A * | 2/1993 | Lacroix .......................... 359/631 |
| 5,309,169 A * | 5/1994 | Lippert .............. G02B 27/0172 345/7 |
| 5,325,386 A | 6/1994 | Jewell et al. |
| 5,347,400 A | 9/1994 | Hunter |
| 5,388,990 A | 2/1995 | Beckman |
| 5,436,763 A | 7/1995 | Chen et al. |
| 5,561,538 A | 10/1996 | Kato et al. |
| 5,572,343 A | 11/1996 | Okamura et al. |
| 5,581,271 A | 12/1996 | Kraemer |
| 5,641,288 A | 6/1997 | Zaenglein, Jr. |
| 5,699,194 A | 12/1997 | Takahashi |
| 5,701,132 A | 12/1997 | Kollin et al. |
| 5,701,202 A | 12/1997 | Takahashi et al. |
| 5,712,649 A | 1/1998 | Tosaki et al. |
| 5,714,967 A | 2/1998 | Okamura et al. |
| 5,715,094 A * | 2/1998 | Ansley ................ G02B 27/017 359/631 |
| 5,754,344 A * | 5/1998 | Fujiyama ...................... 359/631 |
| 5,757,544 A | 5/1998 | Tabata et al. |
| 5,774,268 A | 6/1998 | Takahashi |
| 5,798,738 A | 8/1998 | Yamada |
| 5,798,739 A | 8/1998 | Teitel et al. |
| 5,803,738 A | 9/1998 | Latham |
| 5,834,676 A | 11/1998 | Elliott |
| 5,844,530 A | 12/1998 | Tosaki |
| 5,982,343 A | 11/1999 | Iba et al. |
| 5,999,147 A | 12/1999 | Teitel |
| 6,038,387 A | 3/2000 | Machida |
| 6,140,979 A | 10/2000 | Gerhard et al. |
| 6,140,980 A | 10/2000 | Spitzer et al. |
| 6,160,666 A | 12/2000 | Rallison et al. |
| 6,185,045 B1 | 2/2001 | Hanano |
| 6,201,646 B1 | 3/2001 | Togino et al. |
| 6,215,593 B1 * | 4/2001 | Bruce ........................ G02B 6/08 359/619 |
| 6,266,194 B1 | 7/2001 | Tanijiri |
| 6,445,362 B1 | 9/2002 | Tegreene |
| 6,522,474 B2 | 2/2003 | Cobb et al. |
| 6,529,331 B2 | 3/2003 | Massof et al. |
| 6,549,332 B2 | 4/2003 | Kimura |
| 6,611,253 B1 | 8/2003 | Cohen |
| 6,633,304 B2 | 10/2003 | Anabuki et al. |
| 6,646,811 B2 | 11/2003 | Inoguchi |
| 6,704,128 B2 | 3/2004 | Takeyama et al. |
| 6,731,434 B1 | 5/2004 | Hua et al. |
| 6,751,026 B2 | 6/2004 | Tomono |
| 6,771,423 B2 | 8/2004 | Geist |
| 6,788,442 B2 | 9/2004 | Potin et al. |
| 6,795,042 B1 | 9/2004 | Nagata et al. |
| 6,813,085 B2 | 11/2004 | Richards |
| 6,829,087 B2 | 12/2004 | Freese et al. |
| 6,873,471 B2 | 3/2005 | Coates |
| 6,919,866 B2 | 7/2005 | Kanevsky et al. |
| 6,919,867 B2 | 7/2005 | Sauer |
| 6,963,379 B2 | 11/2005 | Tomono |
| 7,002,551 B2 | 2/2006 | Azuma et al. |
| 7,009,773 B2 | 3/2006 | Chaoulov et al. |
| 7,063,256 B2 | 6/2006 | Anderson et al. |
| 7,068,444 B2 | 6/2006 | Nishi |
| 7,072,096 B2 | 7/2006 | Holman et al. |
| 7,088,516 B2 | 8/2006 | Yagi et al. |
| 7,095,562 B1 | 8/2006 | Peng |
| 7,110,013 B2 | 9/2006 | Ebersole |
| 7,119,965 B1 | 10/2006 | Rolland et al. |
| 7,151,639 B2 | 12/2006 | Lung |
| 7,295,377 B2 | 11/2007 | Edelmann |
| 7,307,791 B2 | 12/2007 | Li et al. |
| 7,324,081 B2 | 1/2008 | Friedrich et al. |
| 7,339,742 B2 * | 3/2008 | Amitai et al. ................ 359/630 |
| 7,385,600 B2 | 6/2008 | Marion |
| 7,391,573 B2 | 6/2008 | Amitai |
| 7,432,879 B2 | 10/2008 | Schonlau |
| 7,446,941 B2 * | 11/2008 | Fukuda ........................ 359/619 |
| 7,499,217 B2 | 3/2009 | Cakmakci et al. |
| 7,545,571 B2 | 6/2009 | Garoutte et al. |
| 7,547,101 B2 | 6/2009 | Fuziak, Jr. |
| 7,573,525 B2 | 8/2009 | Yamasaki |
| 7,605,773 B2 | 10/2009 | Janssen |
| 7,613,356 B2 | 11/2009 | Uchiyama et al. |
| 7,623,294 B2 | 11/2009 | Harada et al. |
| 7,626,562 B2 | 12/2009 | Iwasaki |
| 7,663,793 B1 | 2/2010 | Doucet |
| 7,732,694 B2 | 6/2010 | Rosenberg |
| 7,751,122 B2 | 7/2010 | Amitai |
| 7,765,083 B2 | 7/2010 | Zank et al. |
| 7,804,507 B2 | 9/2010 | Yang et al. |
| 7,812,815 B2 | 10/2010 | Banerjee et al. |
| 7,843,403 B2 | 11/2010 | Spitzer |
| 7,928,927 B1 | 4/2011 | Krenz et al. |
| 7,949,295 B2 | 5/2011 | Kumar et al. |
| 7,965,868 B2 | 6/2011 | Roberts et al. |
| 8,046,719 B2 | 10/2011 | Skourup et al. |
| 8,059,342 B2 | 11/2011 | Burke |
| 8,320,217 B1 | 11/2012 | Barger et al. |
| 8,625,200 B2 | 1/2014 | Smith et al. |
| 8,678,282 B1 | 3/2014 | Black et al. |
| 8,766,879 B2 | 7/2014 | Fujikawa et al. |
| 8,781,794 B2 | 7/2014 | Harrison et al. |
| 8,884,845 B2 | 11/2014 | Yamazaki et al. |
| 8,928,558 B2 | 1/2015 | Lewis et al. |
| 8,964,298 B2 | 2/2015 | Haddick et al. |
| 2001/0033401 A1 | 10/2001 | Kasai et al. |
| 2001/0043163 A1 * | 11/2001 | Waldern et al. .................. 345/7 |
| 2002/0036649 A1 | 3/2002 | Kim et al. |
| 2002/0047987 A1 | 4/2002 | Massengill et al. |
| 2002/0094189 A1 | 7/2002 | Navab et al. |
| 2002/0163486 A1 | 11/2002 | Ronzani et al. |
| 2002/0181115 A1 | 12/2002 | Massof et al. |
| 2002/0186179 A1 | 12/2002 | Knowles |
| 2002/0196554 A1 | 12/2002 | Cobb et al. |
| 2004/0008157 A1 | 1/2004 | Brubaker et al. |
| 2004/0130783 A1 | 7/2004 | Solomon |
| 2004/0174599 A1 | 9/2004 | Dietrich |
| 2005/0046953 A1 | 3/2005 | Repetto et al. |
| 2006/0072215 A1 | 4/2006 | Nishi |
| 2006/0103590 A1 | 5/2006 | Divon |
| 2006/0281061 A1 | 12/2006 | Hightower et al. |
| 2007/0020587 A1 | 1/2007 | Seymore et al. |
| 2007/0097277 A1 | 5/2007 | Hong et al. |
| 2007/0132785 A1 | 6/2007 | Ebersole et al. |
| 2007/0177275 A1 | 8/2007 | McGuire |
| 2007/0219760 A1 | 9/2007 | Yang et al. |
| 2007/0236800 A1 | 10/2007 | Cakmakci et al. |
| 2007/0242131 A1 | 10/2007 | Sanz-Pastor et al. |
| 2007/0243916 A1 | 10/2007 | Lee |
| 2008/0007181 A1 * | 1/2008 | Pickering .................. G09F 9/33 315/82 |
| 2008/0063400 A1 | 3/2008 | Hudson et al. |
| 2008/0123049 A1 | 5/2008 | Volk |
| 2008/0130309 A1 | 6/2008 | Condon et al. |
| 2008/0198459 A1 | 8/2008 | Fergason |
| 2008/0204731 A1 | 8/2008 | Williams |
| 2008/0309586 A1 | 12/2008 | Vitale |
| 2009/0002574 A1 | 1/2009 | Sorek et al. |
| 2009/0015735 A1 | 1/2009 | Simmonds |
| 2009/0040308 A1 | 2/2009 | Temovskiy |
| 2009/0112469 A1 | 4/2009 | Lapidot et al. |

(56) References Cited

U.S. PATENT DOCUMENTS

| | | |
|---|---|---|
| 2009/0122385 A1 | 5/2009 | Hilton |
| 2009/0153437 A1 | 6/2009 | Aharoni |
| 2009/0173788 A1 | 7/2009 | Moraites et al. |
| 2009/0174589 A1 | 7/2009 | Moraites |
| 2009/0228251 A1 | 9/2009 | Cakmakci et al. |
| 2010/0002154 A1 | 1/2010 | Hua |
| 2010/0018285 A1 | 1/2010 | Murphy et al. |
| 2010/0020643 A1 | 1/2010 | Barger et al. |
| 2010/0060551 A1 | 3/2010 | Sugiyama et al. |
| 2010/0103075 A1 | 4/2010 | Kalaboukis et al. |
| 2010/0103196 A1 | 4/2010 | Kumar et al. |
| 2010/0149073 A1 | 6/2010 | Chaum et al. |
| 2010/0171680 A1 | 7/2010 | Lapidot et al. |
| 2010/0214635 A1* | 8/2010 | Sasaki et al. .................. 359/15 |
| 2010/0238161 A1 | 9/2010 | Varga et al. |
| 2010/0245387 A1 | 9/2010 | Bachelder et al. |
| 2010/0277575 A1 | 11/2010 | Ismael et al. |
| 2010/0279255 A1 | 11/2010 | Williams, II |
| 2010/0321409 A1 | 12/2010 | Komori et al. |
| 2011/0018903 A1 | 1/2011 | Lapstun et al. |
| 2011/0057863 A1 | 3/2011 | Sugihara et al. |
| 2011/0130636 A1 | 6/2011 | Daniel et al. |
| 2011/0202306 A1 | 8/2011 | Eng et al. |
| 2011/0213664 A1 | 9/2011 | Osterhout et al. |
| 2011/0214082 A1 | 9/2011 | Osterhout et al. |
| 2011/0221656 A1 | 9/2011 | Haddick et al. |
| 2011/0221657 A1 | 9/2011 | Haddick et al. |
| 2011/0221658 A1 | 9/2011 | Haddick et al. |
| 2011/0221659 A1 | 9/2011 | King, III et al. |
| 2011/0221668 A1 | 9/2011 | Haddick et al. |
| 2011/0221669 A1 | 9/2011 | Shams et al. |
| 2011/0221670 A1 | 9/2011 | King, III et al. |
| 2011/0221671 A1 | 9/2011 | King, III et al. |
| 2011/0221672 A1 | 9/2011 | Osterhout et al. |
| 2011/0221793 A1 | 9/2011 | King, III et al. |
| 2011/0221896 A1 | 9/2011 | Haddick et al. |
| 2011/0221897 A1 | 9/2011 | Haddick et al. |
| 2011/0222745 A1 | 9/2011 | Osterhout et al. |
| 2011/0225536 A1 | 9/2011 | Shams et al. |
| 2011/0227812 A1 | 9/2011 | Haddick et al. |
| 2011/0227813 A1 | 9/2011 | Haddick et al. |
| 2011/0227820 A1 | 9/2011 | Haddick et al. |
| 2011/0231757 A1 | 9/2011 | Haddick et al. |
| 2011/0250962 A1 | 10/2011 | Feiner et al. |
| 2011/0283865 A1 | 11/2011 | Collins |
| 2011/0289810 A1 | 12/2011 | D'Souza et al. |
| 2012/0050144 A1 | 3/2012 | Morlock |
| 2012/0068913 A1 | 3/2012 | Bar-Zeev et al. |
| 2012/0120498 A1 | 5/2012 | Harrison et al. |
| 2012/0120499 A1 | 5/2012 | Harrison et al. |
| 2012/0212400 A1 | 8/2012 | Border et al. |
| 2012/0326948 A1 | 12/2012 | Crocco et al. |
| 2013/0021224 A1 | 1/2013 | Fujikawa et al. |
| 2013/0163090 A1 | 6/2013 | Yu |
| 2014/0104274 A1 | 4/2014 | Hilliges et al. |
| 2014/0152531 A1 | 6/2014 | Murray et al. |
| 2015/0177516 A1 | 6/2015 | Blonde et al. |

FOREIGN PATENT DOCUMENTS

| | | | |
|---|---|---|---|
| DE | 102007009828 A1 | 9/2008 | |
| EP | 1418458 A1 | 5/2004 | |
| EP | 2624238 A1 | 8/2013 | |
| GB | 2461907 A | 1/2010 | |
| JP | 55-164801 A | 12/1980 | |
| JP | 02-032301 A | 2/1990 | |
| JP | 05-303054 A | 11/1993 | |
| JP | H07-134266 A | 5/1995 | |
| JP | H07225790 A | 8/1995 | |
| JP | H07-244246 A | 9/1995 | |
| JP | H08-190072 A | 7/1996 | |
| JP | 08-278476 A | 10/1996 | |
| JP | 10-080575 A | 3/1998 | |
| JP | 10-206786 A | 8/1998 | |
| JP | 2000047138 A | 2/2000 | |
| JP | 2002287077 A | 10/2002 | |
| JP | 2006039359 A | 2/2006 | |
| JP | 2006091477 A | 4/2006 | |
| JP | 2008058461 A | 3/2008 | |
| JP | 2008529064 A | 7/2008 | |
| JP | 2009069364 A | 4/2009 | |
| JP | 2009232133 A | 10/2009 | |
| JP | 2010020065 A | 1/2010 | |
| JP | 2011133633 A | 7/2011 | |
| TW | 244318 B | 11/2005 | |
| WO | 9722964 A1 | 6/1997 | |
| WO | 2005017729 A2 | 2/2005 | |
| WO | 2008051578 A2 | 5/2008 | |
| WO | WO2009/066408 * | 5/2009 | ............ G02B 27/01 |
| WO | 2009094643 A2 | 7/2009 | |
| WO | 2010047212 A1 | 4/2010 | |
| WO | 2010123934 A1 | 10/2010 | |
| WO | 2011114149 A1 | 9/2011 | |
| WO | 2012052980 A2 | 4/2012 | |
| WO | 2012052981 A2 | 4/2012 | |

OTHER PUBLICATIONS

U.S. Appl. No. 13/211,389, filed Aug. 17, 2011.*
U.S. Appl. No. 13/211,365, filed Aug. 17, 2011.*
Kiyokawa, Kiyoshi, "A Wide Field-of-View Head Mounted Projective Display Using Hyperbolic Half-Silvered Mirrors," IEEE, Nov. 16, 2007, Cybermedia Center, Osaka University, Osaka, Japan.
Jeon et al., "Mosaicing a Wide Geometric Field of View for Effective Interaction in Augmented Reality," Mixed and Augmented Reality, 6th IEEE and ACM International Symposium, Mar. 2007, pp. 265-266.
Cakmakci et al., "Optical Free-Form Surfaces in Off-Axis Head-Worn Display Design," Mixed and Augmented Reality, 7th IEEE/ACM International Symposium; Mar. 2008, pp. 29-32.
Takeda et al., "Design and Implementation of a Wide Field-of-View Head Mounted Projective Display," Journal of the Institute of Image Information and Television Engineers, Jun. 2009, pp. 794-800, vol. 63, No. 6, Institute of Image Information and Television Engineers, Osaka, Japan.
Nagahara et al., Wide Field of View Catadioptrical Head Mounted Display, Transactions of the Institute of Electronics, Information and Communication Engineers D-II, Jan. 2005, pp. 95-104, vol. J88D-II, No. 1, Inst. Electron. Inf. & Commun. Eng, Japan.
Pratt, P. D., "Advanced Helmet Sight Reticle Assembly (AHRA)," Jul. 1976, p. 364, Honeywell Inc., Minneapolis Minn. Systems and Research Div.
Nagahara et al., "Wide Field of View Head Mounted Display for Tele-Presence with an Omnidirectional Image Sensor," Computer Vision and Pattern Recognition Workshop, Jun. 16-22, 2003, vol. 7, p. 86.
Takeda et al., "Poster: A Virtual Walkthrough System with a Wide Field-of-View Stereo Head Mounted Projective Display," 3D User Interfaces, IEEE Symposium, Mar. 14-15, 2009, p. 149, Lafayette, LA.
Mori et al., "A Wide-View Parallax-Free Eye-Mark Recorder with a Hyperboloidal Half-Silvered Mirror and Appearance-Based Gaze Estimation," Visualization and Computer Graphics, IEEE Transactions, Aug. 26, 2010, p. 1, vol. pp, No. 99.
Okuma et al., "An Augmented Reality System Using a Real-Time Vision Based Registration," Pattern Recognition, 1998. Proceedings. Fourteenth International Conference, Aug. 16-20, 1998, p. 1226, vol. 2.
Parviz, Babak A. , "Augmented Reality in a Contact Lens," IEEE Spectrum, Sep. 2009, http://spectrum.ieee.org/biomedical/bionics/augmented-reality-in-a-contact-lens/0.
Lingley et al., "A Single-Pixel Wireless Contact Lens Display," J. Micromech. Microeng., Nov. 22, 2011, 21 (2011) 125014 (8pp); doi:10.1088/0960-1317/21/12/125014; Received Jun. 9, 2011, in final form Sep. 19, 2011.
Vuzix High Resolution Video Eyewear—Products; Retrieved from http://www.vuzix.com/consumer; Retrieved Dec. 30, 2011.

(56) References Cited

OTHER PUBLICATIONS

Lumus—Consumer Market Products; Retrieved from http://www.lumus-optical.com/index.php?option=com_content&task=view&id=9&Itemid=15; Retrieved Dec. 30, 2011.
Head Mounted Displays from INITION; Retrieved from http://www.inition.co.uk/3D-Technologies/productsection/31; Retrieved on Dec. 30, 2011.
Azuma et al., "Improving Static and Dynamic Registration in an Optical See-Through HMD," Proc. of ACM SIGGRAPH 1994, Computer Graphics, Annual Conference Series, Orlando, FL, Jul. 24-29, 1994, pp. 197-204.
Cakmakci et al., "Meshfree Approximation Methods for Free-Form Surface Representation In Optical Design With Applications to Head-Worn Displays," Proc. of SPIE, 2008, vol. 7061, 70610D-1, http://www.creol.ucf.edu/Research/Publications/2012.pdf.
Hastings, A., "Eye Box Performance Parameters for Non Pupil Forming. Head/Helmet Mounted Displays," Tutorial, OPT 521, Dec. 6, 2006, www.optics.arizona.edu/optomech/.../tutorials/HastingsTutorial1.doc.
Hopkins et al., "Simple Thin Lens Optical Systems," US Department of Defense, Military Standardization Handbook: Optical Design, MIL-HDBK-141, Oct. 5, 1962, FSC-6650, Section 7, http://www.optics.arizona.edu.opti510l/references/mil-hdbk-141/ch7_12.pdf.
Klepper, Sebastian, "Augmented Reality—Display Systems," Technische Universitaet Muenchen, Munich, Germany, 2007, http://camparin.tum.de/twiki/pub/Chair/TeachingSs07ArProseminar/1_Display-Systems_Klepper_Report.pdf.
Melzer et al. "Guidelines for HMD Design," in Helmet-Mounted Displays: Sensation, Pereption and Cognition Issues, C. E. Rash et al., ed., U.S. Army Aeromedical Research Laboratory, Fort Rucker, AL, 2009, Chapter 17, http://www.usaarl.army.mil/publications/hmd_book09/files/Section%2026%20-%20Chapter17%20Guidelines%20for%20HMD%20design.pdf.
Melzer, James E., "Head-Mounted Displays," The Avionics Handbook, Cary R. Spitzer, ed., CRC Press, Boca Raton FL, 2001, Chapter 5, http://www.davi.ws/avionics/TheAvionicsHandbook_Cap_5.pdf.
Nagahara et al., "Super Wide Viewer Using Catadioptric Optics," Proc. ACM Symposium on Virtual Reality Software and Technology (VRST2003), Oct. 2003, pp. 169-175, Osaka, Japan.
Nagahara et al., "Wide Field of View Catadioptrical Head-Mounted Display," Proc. of 2003 IEEE/RSJ, Intl. Conference on Intelligent Robots and Systems, Las Vegas NV, Oct. 2003, 3738-3743.
Livingston et al., "An Augmented Reality System for Military Operations in Urban Terrain," Proc of I/ITSEC '02, Orlando FL, Dec. 2-5, 2002.
Vanden Brook, T., "Device Helps Pinpoint Snipers: Technology Is Critical for U.S. Combat Troops," USA Today, Wednesday, Mar. 2, 2011.
Schwald et al., An Augmented Reality System for Training and Assistance to Maintenance in the Industrial Context, Journal of WSCG, Feb. 3-7, 2003, vol. 11, No. 1, Plzen, Czech Republic.
Kato et al., "Marker Tracking and HMD Calibration for a Video-based Augmented Reality Conferencing System" 1999.
Kato et al., "Virtual Object Manipulation on a Table-Top AR Environment," 2000.
Billinghurst et al., "Collaboration with Tangible Augmented Reality Interfaces," 2002.
Liu et al., "An Optical See-Through Head Mounted Display with Addressable Focal Planes," IEEE Int'l Symposium on Mixed and Augmented Reality Sep. 15-18, 2008, Cambridge, UK.
Bayer et al., "Introduction to Helmet-Mounted Displays," 2009, U.S. Army Medical Dept., Medical Research and Material Command.
Rolland et al., "Invited Paper: Head-Worn Displays—Lens Design," 48th Annual SID Symposium, Seminar, and Exhibition 2010, Display Week 2010, May 23, 2010-May 28, 2010, vol. 2, pp. 855-858, Society for Information Display.

Spitzer et al., "Video I/O Interface for Wearable Computers," Proceedings of the SPIE—The International Society for Optical Engineering, vol. 3689, pp. 278-283, 1999, Conference: Helmet- and Head-Mounted Displays IV, Apr. 5-6, 1999, Orlando, FL, SPIE-Int. Soc. Opt. Eng, USA.
Upton et al., "Eyeglass Head-Up Display [Vibrating Fiber Optic Assembly," 1981 SID International Symposium. Digest of Papers, Apr. 28-30, 1981, vol. XII, pp. 48-49, New York, NY, SID, Los Angeles, CA.
Rose, Melinda, "Microdisplays: Coming Soon to an Eye Near You?" Photonics Spectra, Sep. 2008, vol. 42, No. 9, pp. 68-69, Laurin Publishing Co. Inc.
Kurze et al., "Smart Glasses: An Open Environment for AR Apps," 2010 9th IEEE International Symposium on Mixed and Augmented Reality (ISMAR). Science & Technology Papers, Oct. 13-16, 2010, 313, 2010, Seoul, South Korea.
Schonlau et al., "Personal Viewer: A Wide-Field Low-Profile See-Through Eyewear Display," Proceedings of the SPIE—The International Society for Optical Engineering, Apr. 14-16, 2004, vol. 5443, No. 1, pp. 277-287, Orlando, FL, SPIE-Int. Soc. Opt. Eng.
Mukawa et al., "A Full Color Eyewear Display Using Holographic Planar Waveguides," IDW '08—Proceedings of the 15th International Display Workshops, Dec. 3, 2008-Dec. 5, 2008, vol. 1, pp. 259-262, Inst. of Image Information and Television Engineers.
Mukawa et al., "A Full-Color Eyewear Display Using Planar Waveguides with Reflection Volume Holograms," Journal of the Society for Information Display, vol. 17, No. 3, pp. 185-193, Mar. 2009, Society for Information Display.
DeJong, C. Dean, "Full-Color, See-Through, Daylight-Readable, Goggle-Mounted Display," Proceedings of SPIE—The International Society for Optical Engineering, Apr. 28, 2011-Apr. 28, 2011, vol. 8041, SPIE.
Von Waldkirch et al., "Spectacle-Based Design of Wearable See-Through Display for Accommodation-Free Viewing," Pervasive Computing. Second International Conference, Pervasive 2004. Proceedings. (Lecture Notes in Comput. Sci. vol. 3001), Apr. 18-23, 2004, 106-23, Springer-Verlag, Berlin, Germany.
Ayras et al., "Near-To-Eye Display Based on Retinal Scanning and a Diffractive Exitpupil Expander," Proceedings of SPIE—The International Society for Optical Engineering, Apr. 12, 2011-Apr. 15, 2010, vol. 7723, No. 77230V, SPIE.
Ferscha et al., "Wearable Displays for Everyone!" IEEE Pervasive Computing, Jan.-Mar. 2010, vol. 9, No. 1, pp. 7-10, Institute of Electrical and Electronics Engineers Inc.
"SEOS Ultra Wide Field-of-View Head Mounted Display," http://cgsd.com/SEOSHMD/, Jan. 3, 2003.
"A New Reality for Mobile, Mobile AR White Paper", [Online] Downloaded at http://juniperresearch.com/shop/viewwhitepaper.php?whitepaper=131, (Feb. 2011), 5 pgs.
"ABI Research Aniticpates Dramatic Growth for Augmented Reality via Smartphones", [Online] Downloaded at http://www.abiresearch.com/press/1516-ABI+Research+Anticipates+%E2%80%9CDramatic+Growth%E2%80%9D+for+Augmented+Reality+via+Smartphones, ABIresearch technology market intelligence, (Oct. 22, 2009), 1 pg.
"Immersive Displays: Powerwall, CAVE, Headmounted Displays (HMD) / Intersense—Sensing Every Move", [Online] Downloaded at http://www.intersense.com/categories/11/, (2011), 3 pgs.
Amery, John G., et al., "Flight Simulation Visual Requirements and a New Display System", Proc. SPIE, 3690, (Aug. 16, 1999), 356-367.
Gartner, "Mobility market will reach $1 trillion by 2014 / Visage mobile—Mobility Management News and Blogs", [Online] Downloaded at http://www.visagemobile.com/news/news/mobile-strategy-and-policy-news/5437/gartner-mobility-market-will-reach-1-trillion-by-2014/, (Oct. 21, 2010), 3 pgs.
Henderson, Steve, et al., "Augmented Reality for Maintenance and Repair (ARMAR)", [Online] Downloaded at http://graphics.cs.columbia.edu/projects/armar/, (Aug. 2007), 4 pgs.
Nagahara, "Wide Field of View Head Mounted Display for Telepresence with An Omnidirectional Image Sensor", Computer Vision and Pattern Recognition Workshop 2003 vol. 7, (2003), 6 pgs.

(56) References Cited

OTHER PUBLICATIONS

Perey, Christine, et al., "Where's the Money? Mobile AR Revenue Streams", [Online] Downloaded at http://www.perey.com/MobileARSummit/PEREY-Mobile%20AR-Revenue-Streams.pdf, (Feb. 9, 2010), 4 pgs.
Rolland, Jannick, et al., "Development of Head-Mounted Projection Displays for Distributed, Collaborative, Augmented Reality Applications", [Online] http://www.creol.ucf.edu/Research/Publications/1357.PDF, (Accessed Mar. 7, 2011), 22 pgs.
Yang et al., "Hybrid Diffractive-Refractive 67 degree-Diagonal Field of View Optical See-Through Head-Mounted Display," Institute of Modern Optics, Aug. 17, 2005, pp. 351-355, vol. 116, No. 7, Optik—Internat, Nankai University, Tianjin, China.
International Search Report for PCT/IB2011/055824 mailed May 16, 2012, 4 pages.
Written Opinion of the International Searching Authority for PCT/IB2011/055824 mailed May 2, 2013, 5 pages.
International Preliminary Report on Patentability for PCT/IB2011/055824 mailed May 2, 2013, 7 pages.
International Search Report for PCT/IB2011/055820 mailed May 21, 2012, 4 pages.
International Search Report and Written Opinion for PCT/US2011/065201 mailed Mar. 7, 2012, 14 pages.
International Preliminary Report on Patentability for PCT/US2011/065201 mailed Jun. 27, 2013, 11 pages.
International Search Report for PCT/IB2011/055826 mailed Sep. 14, 2012, 4 pages.
International Preliminary Report on Patentability for PCT/IB2011/055826 mailed May 2, 2013, 11 pages.
Non-final Office Action for U.S. Appl. No. 13/211,365 mailed Oct. 24, 2012, 12 pages.
Final Office Action for U.S. Appl. No. 13/211,365 mailed Feb. 22, 2013, 15 pages.
Non-final Office Action and Examiner-Initiated Interview Summary for U.S. Appl. No. 13/211,365 mailed Jun. 14, 2013, 18 pages.
Final Office Action for U.S. Appl. No. 13/211,365 mailed Oct. 18, 2013, 22 pages.
Non-final Office Action for U.S. Appl. No. 13/211,372 mailed Nov. 21, 2012, 9 pages.
Non-final Office Action for U.S. Appl. No. 13/211,372 mailed Mar. 7, 2013, 12 pages.
Final Office Action for U.S. Appl. No. 13/211,372 mailed Aug. 1, 2013, 7 pages.
Notice of Allowance for U.S. Appl. No. 13/211,372 mailed Sep. 6, 2013, 8 pages.
Non-final Office Action for U.S. Appl. No. 13/211,389 mailed Feb. 26, 2013, 21 pages.
Final Office Action for U.S. Appl. No. 13/211,389 mailed Jul. 12, 2013, 25 pages.
Notice of Allowance and Applicant-Initiated Interview Summary for U.S. Appl. No. 13/211,389 mailed Sep. 19, 2013, 10 pages.
Rolland, J. P., et al., "Development of Head-Mounted Projection Displays for Distributed, Collaborative, Augmented Reality Applications", *Presence*, 14(5), (2005), 528-549.
Notice of Allowance for U.S. Appl. No. 13/211,389 mailed Jan. 6, 2014, 8 pages.
Feiner, Steven, et al., "MARS—Mobile Augmented Reality Systems," Columbia University, Computer Graphics and User Interfaces Lab, Downloaded at http://graphics.cs.columbia.edu/projects/mars/, Accessed on Mar. 7, 2011, 4 pages.
Notice of Allowance for U.S. Appl. No. 13/211,365 mailed Aug. 8, 2014, 7 pages.
Non-final Office Action for U.S. Appl. No. 13/211,365 mailed Apr. 22, 2014, 9 pages.
Author Unknown, "VST-2200FL Flight Simulator," Virtual SimTech, 2013, http://www.virtualsimtech.com/flightsimulators.htm, 2 pages.
McClernon, Chris et al., "PC-Based Desktop Display versus Immersive Head-Mounted Display Flight Simulator Performance," Interservice/Industry Training, Simulation, and Education Conference (I/ITSEC), Dec. 2006, http://www.iitsecdocs.com, 7 pages.
Wang, Robert Y. et al., "Real-time hand-tracking with a color glove," retrieved Dec. 16, 2014 from http://people.csail.mit.edu/rywang/hand/, 3 pages.
Yavrucuk, I. et al., "A Low Cost Flight Simulator Using Virtual Reality Tools," IEEE Aerospace and Electronics Systems Magazine, vol. 26, Issue 4, Apr. 2011, IEEE, pp. 10-14.
Examination Report for Australian Patent Application No. 2011319480 issued Oct. 27, 2014, 3 pages.
Examination Report for Australian Patent Application No. 2011319481 issued Oct. 23, 2014, 3 pages.
Examination Report for Australian Patent Application No. 2011343660 issued Oct. 31, 2014, 3 pages.
First Office Action for Chinese Patent Application No. 201180060659.0, issued Nov. 3, 2014, 10 pages.
First Office Action for Chinese Patent Application No. 201180060662.2, issued Nov. 2, 2014, 13 pages.
First Office Action for Chinese Patent Application No. 201180067287.4, issued Feb. 4, 2015, 11 pages.
Office Action for Mexican Patent Application No. MX/a/2013/006722, mailed Dec. 8, 2014, 7 pages.
Non-Final Office Action for U.S. Appl. No. 13/211,365, mailed Jan. 12, 2015, 20 pages.
Second Office Action for Chinese Patent Application No. 201180060659.0, issued Jun. 30, 2015, 6 pages.
Second Office Action for Chinese Patent Application No. 201180060662.2, issued Jun. 10, 2015, 7 pages.
Final Office Action for U.S. Appl. No. 13/211,365, mailed Jun. 15, 2015, 23 pages.
Notification of Reason(s) for Rejection for Japanese Patent Application No. JP 2013-534454, mailed Sep. 17, 2015, 7 pages.
Second Office Action for Chinese Patent Application No. 201180067287.4, issued Oct. 10, 2015, 9 pages.
Notification of Reason(s) for Rejection for Japanese Patent Application No. JP 2013-544784, mailed Aug. 17, 2015, 9 pages.
Patent Examination Report No. 2 for Australian Patent Application No. 2011343660, issued Oct. 22, 2015, 3 pages.
Notice of Allowance for U.S. Appl. No. 13/211,365, mailed Sep. 21, 2015, 7 pages.
Notice of Allowance and Search Report for Taiwanese Patent Application No. 100148681, mailed Mar. 14, 2016, 12 pages.
International Search Report and Written Opinion for PCT/US2015/055918, mailed Jan. 27, 2016, 9 pages.
Examination Report for European Patent Application No. 11815630.6, mailed Nov. 20, 2015, 4 pages.
Notice of Acceptance for Australian Patent Application No. 2011319481, mailed Oct. 12, 2015, 3 pages.
Office Action and Search Report for Taiwanese Patent Application No. 100148681, mailed Oct. 5, 2015, 15 pages.
Examination Report for European Patent Application No. 11806088.8, mailed Oct. 27, 2015, 3 pages.
Notification of Reason(s) for Rejection for Japanese Patent Application No. 2013-534453, mailed Dec. 22, 2015, 9 pages.
Third Office Action for Chinese Patent Application No. 201180060659.0, mailed Dec. 15, 2015, 6 pages.
Office Action and Search Report for Taiwanese Patent Application No. 100148694, mailed Dec. 1, 2015, 18 pages.
Non-final Office Action for U.S. Appl. No. 13/211,365, mailed Feb. 2, 2016, 15 pages.
Debevec, Paul, et al., "A Lighting Reproduction Approach to Live-Action Compositing," Proceedings of the 29th annual conference on Computer graphics and interactive techniques (SIGGRAPH), Jul. 21-26, 2002, San Antonio, Texas, ACM, pp. 1-10.
Wese, Jamie, "SIGGRAPH paper: Infrared Chroma Key," waese.com/infrared-chroma-key/, 2015, Jamie Waese, pp. 1-3.
Decision of Final Rejection for Japanese Patent Application No. 2013-534453, mailed Jul. 26, 2016, 5 pages.
Patent Examination Report No. 1 for Australian Patent Application No. 2015249168, issued Jun. 27, 2016, 3 pages.
Notification of Reasons for Rejection for Japanese Patent Application No. 2013-534454, mailed Jun. 1, 2016, 13 pages.

(56) References Cited

OTHER PUBLICATIONS

Notification of Reasons for Rejection for Japanese Patent Application No. 2013-544784, mailed May 31, 2016, 11 pages.
Final Office Action for U.S. Appl. No. 13/211,365, mailed Jul. 11, 2016, 13 pages.
Non-Final Office Action for U.S. Appl. No. 14/884,975, mailed Sep. 9, 2016, 30 pages.
Non-Final Office Action for U.S. Appl. No. 14/501,509, mailed Jul. 15, 2016, 7 pages.
International Search Report and Written Opinion for International Patent Application No. PCT/US2016/020444, mailed Jun. 14, 2016, 11 pages.
Non-Final Office Action for U.S. Appl. No. 13/303,607, mailed Mar. 20, 2014, 23 pages.
Final Office Action for U.S. Appl. No. 13/303,607, mailed Oct. 9, 2014, 27 pages.
Non-Final Office Action for U.S. Appl. No. 13/304,780 mailed Jan. 30, 2013, 13 pages.
Final Office Action for U.S. Appl. No. 13/304,780, mailed Aug. 15, 2013, 16 pages.
Notice of Allowance and Applicant-Initiated Interview Summary for U.S. Appl. No. 13/304,780, mailed Nov. 8, 2013, 15 pages.
Unknown, "Optical head-mounted display," Wikipedia, last modified Feb. 25, 2016, en.wikipedia.org/wiki/Optical_head-mounted_display, 18 pages.
Hua, Hong, "Past and future of wearable augmented reality displays and their applications," SPIE Proceedings, vol. 9186, Oct. 20, 2014, SPIE, pp. 91860O-1 to 91860O-12.
Olwal, Alex, et al., "ASTOR: An Autostereoscopic Optical See-through Augmented Reality System," Proceedings of the Fourth IEEE and ACM International Symposium on Mixed and Augmented Reality, Oct. 5-8, 2005, Vienna, Austria, IEEE, pp. 24-27.
Rolland, Jannick, P., "Wide-angle, off-axis, see-through head-mounted display," Optical Engineering, vol. 39, Issue 7, Jul. 1, 2000, Society of Photo-Optical Instrumentation Engineers, pp. 1760-1767.
Examination Report for European Patent Application No. 11815631.4, mailed Apr. 13, 2016, 11 pages.
Third Office Action for Chinese Patent Application No. 201180067287.4, mailed Apr. 12, 2016, 10 pages.
Advisory Action for U.S. Appl. No. 13/211,365, mailed Nov. 7, 2016, 3 pages.
Applicant-Initiated Interview Summary for U.S. Appl. No. 13/211,365, mailed Nov. 17, 2016, 4 pages.
Notice of Allowance and Applicant-Initiated Interview Summary for U.S. Appl. No. 13/211,365, mailed Nov. 23, 2016, 9 pages.
Final Office Action for U.S. Appl. No. 14/884,975, mailed Feb. 8, 2017, 36 pages.
Second Office Action for Mexican Patent Application No. MX/a/2013/004453, mailed Jan. 19, 2017, 6 pages.
Examination Report for European Patent Application No. 11806088.8, mailed Dec. 7, 2016, 5 pages.
International Search Report for International Patent Application No. PCT/US2016/057731, mailed Dec. 19, 2016, 12 pages.
Office Action for Mexican Patent Application No. MX/a/2013/004453, mailed Oct. 12, 2016, 3 pages.
Office Action for Mexican Patent Application No. MX/a/2013/004454, mailed Oct. 12, 2016, 3 pages.
Decision of Rejection for Chinese Patent Application No. 201180067287.4, issued Oct. 17, 2016, 14 pages.
Notice of Acceptance for Australian Patent Application No. 2015249168, mailed Nov. 4, 2016, 2 pages.
Decision of Final Rejection for Japanese Patent Application No. 2013-534454, mailed Mar. 31, 2017, 9 pages.
Decision of Final Rejection for Japanese Patent Application No. 2013-544784, mailed Mar. 31, 2017, 9 pages.
International Preliminary Report on Patentability for International Patent Application No. PCT/US2015/055918, mailed Apr. 27, 2017, 6 pages.
Notice of Allowance for U.S. Appl. No. 13/211,365, mailed Mar. 28, 2017, 4 pages.
Advisory Action for U.S. Appl. No. 14/884,975, mailed Apr. 21, 2017, 3 pages.
Non-Final Office Action for U.S. Appl. No. 151058,739, mailed May 23, 2017, 9 pages.

\* cited by examiner

COLLIMATING DISPLAY WITH PIXEL LENSES

CROSS-REFERENCE TO RELATED APPLICATIONS

This application claims priority to U.S. Provisional Application Ser. No. 61/423,934 (entitled COLLIMATING DISPLAY WITH PIXEL LENSES, filed Dec. 16, 2010), U.S. Provisional Application Ser. No. 61/424,162 (entitled PIXEL LENS APPROACH TO AUGMENTED REALITY HEAD MOUNT DISPLAY, filed Dec. 17, 2010), and U.S. Provisional Application Ser. No. 61/424,166 (entitled PIXEL LENS APPROACH TO IMMERSIVE HEAD MOUNT DISPLAY, filed Dec. 17, 2010), all of which are incorporated herein by reference.

FIELD

This disclosure relates to head-mounted display apparatus and, in particular, to head-mounted display apparatus that employs an array of lenses for collimating or partially collimating light emitted from a pixelized image display system (the lenses of the array are referred to herein as "pixel lenses"). In certain embodiments, the apparatus also employs one or more reflective optical surfaces, e.g., one or more free space, ultra-wide angle, reflective optical surfaces (hereinafter abbreviated as "FS/UWA/RO surfaces"). In certain embodiments, the overall optical system is a non-pupil forming system, i.e., the controlling aperture (aperture stop) of the entire system is the pupil of the user's eye.

The pixel lenses and, when used, the one or more reflective surfaces (e.g., the one or more FS/UWA/RO surfaces) are employed to display imagery from a light-emitting display system held in close proximity to a user's eye.

BACKGROUND

A head-mounted display such as a helmet-mounted display or eyeglass-mounted display (abbreviated herein as a "HMD") is a display device worn on the head of an individual that has one or more small display devices located near one eye or, more commonly, both eyes of the user.

Some HMDs display only simulated (computer-generated) images, as opposed to real-world images, and accordingly are often referred to as "virtual reality" or immersive HMDs. Other HMDs superimpose (combine) a simulated image upon a non-simulated, real-world image. The combination of non-simulated and simulated images allows the HMD user to view the world through, for example, a visor or eyepiece on which additional data relevant to the task to be performed is superimposed onto the forward field of view (FOV) of the user. This superposition is sometimes referred to as "augmented reality" or "mixed reality."

Combining a non-simulated, real-world view with a simulated image can be achieved using a partially-reflective/partially-transmissive optical surface (a "beam splitter") where the surface's reflectivity is used to display the simulated image as a virtual image (in the optical sense) and the surface's transmissivity is used to allow the user to view the real world directly (referred to as an "optical see-through system"). Combining a real-world view with a simulated image can also be done electronically by accepting video of a real world view from a camera and mixing it electronically with a simulated image using a combiner (referred to as a "video see-through system"). The combined image can then be presented to the user as a virtual image (in the optical sense) by means of a reflective optical surface, which in this case need not have transmissive properties.

From the foregoing, it can be seen that reflective optical surfaces can be used in HMDs which provide the user with: (i) a combination of a simulated image and a non-simulated, real world image, (ii) a combination of a simulated image and a video image of the real world, or (iii) purely simulated images. (The last case is often referred to as an "immersive" system.) In each of these cases, the reflective optical surface produces a virtual image (in the optical sense) that is viewed by the user. Historically, such reflective optical surfaces have been part of optical systems whose exit pupils have substantially limited not only the dynamic field of view available to the user, but also the static field of view. Specifically, to see the image produced by the optical system, the user needed to align his/her eye with the optical system's exit pupil and keep it so aligned, and even then, the image visible to the user would not cover the user's entire full static field of view, i.e., the prior optical systems used in HMDs that have employed reflective optical surfaces have been part of pupil-forming systems and thus have been exit-pupil-limited.

The reason the systems have been so limited is the fundamental fact that the human field of view is remarkably large. Thus, the static field of view of a human eye, including both the eye's foveal and peripheral vision, is on the order of ~150° in the horizontal direction and on the order of ~130°) in the vertical direction. (For the purposes of this disclosure, 150 degrees will be used as the straight ahead static field of view of a nominal human eye.) Well-corrected optical systems having exit pupils capable of accommodating such a large static field of view are few and far between, and when they exist, they are expensive and bulky.

Moreover, the operational field of view of the human eye (dynamic field of view) is even larger since the eye can rotate about its center of rotation, i.e., the human brain can aim the human eye's foveal+peripheral field of view in different directions by changing the eye's direction of gaze. For a nominal eye, the vertical range of motion is on the order of ~40° up and ~60° down and the horizontal range of motion is on the order of ±~50° from straight ahead. For an exit pupil of the size produced by the types of optical systems previously used in HMDs, even a small rotation of the eye would substantially reduce what overlap there was between the eye's static field of view and the exit pupil and larger rotations would make the image disappear completely. Although theoretically possible, an exit pupil that would move in synchrony with the user's eye is impractical and would be prohibitively expensive.

In view of these properties of the human eye, there are three fields of view which are relevant in terms of providing an optical system which allows a user to view an image generated by an image display system in the same manner as he/she would view the natural world. The smallest of the three fields of view is that defined by the user's ability to rotate his/her eye and thus scan his/her fovea over the outside world. The maximum rotation is on the order of ±50° from straight ahead, so this field of view (the foveal dynamic field of view) is approximately 100°. The middle of the three fields of view is the straight ahead static field of view and includes both the user's foveal and peripheral vision. As discussed above, this field of view (the foveal+peripheral static field of view) is on the order of 150°, e.g., ~168°. The largest of the three fields of view is that defined by the user's ability to rotate his/her eye and thus scan his/her foveal plus his/her peripheral vision over the outside world. Based on a maximum rotation on the order of ±50° and a foveal+ peripheral static field of view on the order of 150°, this largest field of view (the foveal+peripheral dynamic field of view) is on the order of 200°. This increasing scale of fields of view from at least 100 degrees to at least 150 degrees and then to at least 200 degrees provides corresponding benefits to the user in terms of his/her ability to view images generated by an image display system in an intuitive and natural manner.

In order for the human eye to focus easily on a display that is within 10 inches of the eye, a form of collimation needs to be applied to the light rays emanating from the display. The collimation serves to make the light rays appear as if they originate from a distance greater than the actual distance between the eye and the display. The greater apparent distance, in turn, allows the eye to readily focus on an image of the display. Some head-mounted displays use gross level mirrors, lenses, or prisms in an attempt to collimate light from the display. These approaches add bulk and weight, making such head-mounted displays more cumbersome and heavier than desired. Also, because the approaches seek to collimate the light from all of the pixels as a group, they both lack the ability to control collimation on a pixel-by-pixel basis and tend to introduce optical aberrations into the resulting collimated light beam.

There thus exists a need for head-mounted displays that are compatible with the focusing ability as well as with at least the foveal dynamic field of view of the human eye. The present disclosure is directed to these needs and provides head-mounted displays that produce collimated (or substantially collimated) light over a wide field of view.

DEFINITIONS

In the remainder of this disclosure and in the claims, the phrase "virtual image" is used in its optical sense, i.e., a virtual image is an image that is perceived to be coming from a particular place where in fact the light being perceived does not originate at that place.

Throughout this disclosure, the following phrases/terms shall have the following meanings/scope:

(1) The phrase "a reflective optical surface" (also referred to herein as a "reflective surface" or a "reflector") shall include a surface (whether flat, curved, continuous, or composed of spatially-separated portions) that is only reflective as well as a surface that is both reflective and transmissive. In either case, the reflectivity can be only partial, i.e., part of the incident light can be transmitted through the surface. Likewise, when the surface is both reflective and transmissive, the reflectivity and/or the transmissivity can be partial. As discussed below, in certain embodiments, a single reflective optical surface can be used for both eyes or each eye can have its own individual reflective optical surface. Other variations include using multiple reflective optical surfaces for either both eyes or individually for each eye. Mix and match combinations can also be used, e.g., a single reflective optical surface can be used for one eye and multiple reflective optical surfaces for the other eye. As a further alternative, one or multiple reflective optical surfaces can be provided for only one of the user's eyes. The claims set forth below are intended to cover these and other reflective optical surface configurations. In particular, each claim that calls for a reflective optical surface is intended to cover head-mounted display apparatus that includes at least one such surface.

(2) The phrase "an image display system having a light-emitting surface which comprises an array of light-emitting pixels" (also referred to herein as an "image display system" or a "display system") is used generally to include any system having a pixelized surface (whether flat, curved, continuous, or composed of spatially-separated portions) which emits light to form a human-perceivable image whether by transmission of light through the surface, generation of light at the surface (e.g., by an array of LEDs), reflection off of the surface of light from another source, or the like. The system can employ one or multiple image display devices, e.g., one or multiple LED, OLED, and/or LCD arrays. As with reflective optical surfaces, a single image display system can be used for both eyes or each eye can have its own individual image display system. Other variations include using multiple image display systems for either both eyes or individually for each eye. Mix and match combinations can also be used, e.g., a single image display system can be used for one eye and multiple image display systems for the other eye. As a further alternative, one or multiple image display systems can be provided for only one of the user's eyes. The claims set forth below are intended to cover these and other image display system configurations. In particular, each claim that calls for an image display system having a light-emitting surface which comprises an array of light-emitting pixels is intended to cover head-mounted display apparatus that includes at least one such system.

(3) The phrase "display assembly" refers to the combination of an image display system and an array of pixel lenses on the light emitting side of the image display system.

(4) The phrase "binocular viewer" means an apparatus that includes at least one separate optical element (e.g., one display device and/or one reflective optical surface) for each eye, (5) The phrase "field of view" and its abbreviation FOV refer to the "apparent" field, of view in image (eye) space as opposed to the "real" field of view in object (i.e., display) space.

(6) The phrase "substantially collimated" depends on the particular application of the technology disclosed herein but in general terms, light from a light-emitting pixel is "substantially collimated" if its vergence at the user's eye is greater than $-1.0$ diopters. For reference, a point source at 25 meters has a vergence of $-0.04$ diopters and thus if a pixel lens or a combination of a pixel lens and a curved reflective optical surface (when used) causes the light from a pixel to appear to a user to come from a distance of 25 meters such light would have a vergence at the user's eye of $-0.04$ diopters which is greater than $-1.0$, i.e., less negative than $-1.0$, and thus such light would be considered substantially collimated. For further reference, light emitted from an image display system without any collimation can have a vergence at approximately 3 centimeters on the order of $-33$ diopters.

SUMMARY

Embodiments relate to an apparatus and method. An embodiment of the head-mounted display apparatus comprises a frame adapted to be mounted on a user's head, an image display system having a light-emitting surface which comprises an array of light-emitting pixels, said image display system being supported by the frame, a reflective optical surface supported by the frame, and an array of pixel lenses located between the array of light-emitting pixels and the reflective optical surface, one pixel lens for each light-emitting pixel of the array of light-emitting pixels, said one pixel lens being aligned with configured to receive light from its associated light-emitting pixel. The array of pixels lenses either alone or in combination with the reflective optical surface is configured to collimate or substantially collimate the light emitted from the array of light-emitting pixels.

Another embodiment of the head-mounted display apparatus comprises a frame adapted to be mounted on a user's head, an image display system having a light-emitting surface which comprises an array of light-emitting pixels, said image display system being supported by the frame, a free-space, ultra-wide angle, reflective optical surface supported by the frame, and an array of pixel lenses located between the array of light-emitting pixels and the free-space, ultra-wide angle, reflective optical surface, one pixel lens for each light-emitting pixel of the array of light-emitting pixels, said one pixel lens being aligned with and configured to receive light from its associated light-emitting pixel. The free-space, ultra-wide angle, reflective optical surface and the array of pixel lenses produce spatially-separated virtual images of spatially-separated portions of the light-emitting surface, at least one of the spatially-separated virtual images being angularly separated from at least one other of the spatial separated virtual images by an angular separation at least 100 degrees, the angular separation being measured from a center of rotation of a nominal user's eye.

An embodiment of the method comprises the steps of generating an image by an image display system having a light-emitting surface which comprises an array of light-emitting pixels, independently collimating or substantially collimating light from each respective one light-emitting pixel of the array of light-emitting pixels by a respective one pixel lens of an array of pixel lenses aligned with the array of light-emitting pixels, providing the collimated or substantially collimated light from the array of pixel lenses to a reflector positioned relative to an eye of a user, and reflecting the collimated or substantially collimated light from the reflector to the user's eye.

DETAILED DESCRIPTION

Figure 1:
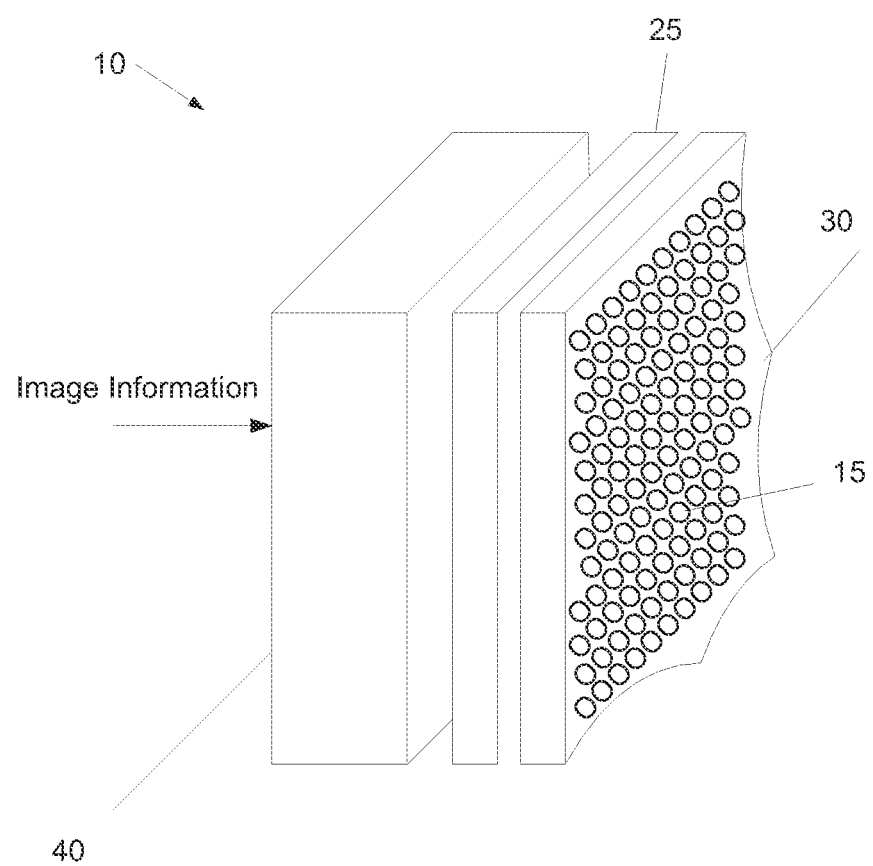
FIG. 1 is a partial block representation of a display assembly that includes a collimating pixel lens for each pixel according to an example embodiment.

It is to be understood that both the foregoing general description and the following detailed description are merely exemplary of the invention and are intended to provide an overview or framework for understanding the nature and character of the invention. Additional features and advantages of the invention are set forth in the detailed description which follows, and in part will be readily apparent to those skilled in the art from that description or recognized by practicing the invention as exemplified by the description herein. The accompanying drawings are included to provide a further understanding of the invention, and are incorporated in and constitute a part of this specification. It is to be understood that the various features of the invention disclosed in this specification and in the drawings can be used in any and all combinations. Similarly, the various limitations of the claims can be used in any and all combinations.

I. Introduction

As discussed above, the present disclosure relates to HMDs which provide a user with a collimated (or substantially collimated) image through the use of pixel lenses. The pixel lenses may be the sole source of collimation in the optical system or, in embodiments that employ a curved reflective optical surface, e.g., a FS/UWA/RO surface, the collimation provided by the pixel lenses may be combined with collimation contributed by the curved reflective optical surface.

In general terms, in certain embodiments, the HMD's image display system is placed directly in front of the eye for use as an immersive display device. In other embodiments, the HMD includes a flat or curved beam-splitter for reflecting the illumination from the image display system to produce an augmented-reality display device. If desired, the reflective embodiments can be used to produce an immersive display device by making the reflective surface non-transmissive.

The following discussion begins with a description of non-limiting examples of embodiments of pixel lenses that can be used in the HMDs disclosed herein (Section ft) and then proceeds to a discussion of HMDs that employ at least one curved reflective optical surface, including HMDs that employ at least one FS/UWA/RO surface (Section III). Section III also includes a discussion of the design process for a FS/UWA/RO surface that is used in an optical system that includes pixel lenses. Following Section III, embodiments that employ a reflective optical surface that is not a curved surface are discussed (Section IV), followed by embodiments in which an image display system is viewed directly without the use of a reflective surface (Section V). Finally, a general discussion applicable to the various embodiments disclosed herein is presented (Section VI).

It should be understood that the discussions of the various components of HMDs that appear in particular sections of the presentation are not limited to the embodiments of that section, but are generally applicable to all of the embodiments disclosed herein. As one example, the descriptions of the types of pixel lenses and image display systems that may be used in a HMD which appear in Sections II and III are applicable to all of the embodiments disclosed herein.

II. Pixel Lenses

As discussed above and in more detail below, the pixel lenses perform collimation (or partial collimation) of the light emitted by an image display system so as to allow viewing of the system when located near to a user's eye without introducing substantial bulk or weight into the HMD. Having a single lens per pixel reduces the size of the display optics required, and eliminates the distortion that would result from performing collimation with just a single large mirror or lens. In particular, the pixel lenses do not cause wide-field aberrations in the images produced by the display because they process only one pixel at a time. Moreover, a large array of pixel lenses may be provided to permit as wide a field of view as desired for the user. In particular, in certain embodiments, the pixel lens technology allows viewing of a display screen, such as a screen similar to a cellular phone display, in close proximity but stretched out across a reflective surface, if desired, each pixel lens may be varied independently based on the location of its associated one pixel with respect to the user's eye.

FIG. 1 is a partial block diagram of an image display system 10 and its associated array of pixel lenses 15 according to an example embodiment. The image display system 10 comprises a computer output or projection surface 25 and, in this embodiment, an image projecting assembly 40. The surface 25 includes a plurality or array of light-emitting pixels (e.g., pixels 120 of FIGS. 2 and 3). The image display system 10 produces text, graphic or video images (hereinafter referred to as an "image") perceivable by the human eye. The plurality or array of light-emitting pixels and image projection assembly 40 may be manufactured using liquid crystal display (LCD) technology, light-emitting diode (LED) technology, organic light emitting diode (OLED) technology, gas plasma technology, fiber optic bundle technology or other image projection technology now known or subsequently developed. Associated with the image display system 10 is a plurality or array of pixel lenses 15 on or in a substrate 30. Each pixel lens 15 is of a small size, e.g., in the micrometer (μm) range, and is configured to be aligned with a single light-emitting pixel of the image display system such that light emanating front the pixel is collimated or partially collimated to facilitate viewing of the images formed by the image display system at a close range.

Depending on the particulars of the image display system 10, the system will generally include multiple layers, films and/or substrates with filters, emitters, etc. to produce a displayed image on the system's light-emitting surface (the system's screen) for viewing by a user, as is well established. In one embodiment, each light-emitting pixel is controlled by pixel control information such as red, green and blue (RGB) data that corresponds to the color intensities of a particular pixel. The image display system 10 may receive RGB input data or other image information from a graphics source (e.g. camera 540 of FIG. 6). The RGB data is used to drive row and column driver circuits or other means to control the pixels to display the image in a manner observable by the human eye. In one embodiment, the image display system 10 may include a flat panel display screen. In other embodiments, the image display system may include a curved display screen.

In operation, the image display system is constructed to control light at the pixel level. In particular, the intensity of each light-emitting pixel may be independently varied based on its location with respect to the eye and/or its associated pixel lens. In this way, the image produced by the display system can have substantially uniform intensity across the field of view during near-to-the-eye viewing.

In some embodiments, the use of the pixel lenses may simplify other optics used in the head-mounted display apparatus. For example, in some embodiments, the lensing or mirror constructions that would otherwise be used for collimation are no longer needed. All the remaining optics would then be only concerned with distributing the available collimated pixel beams across an appropriate field of view to provide a desired field of view to the user, if any further optics are needed at all. More optics may be needed in the augmented reality case, but in this case, there can be no need to provide collimation, just distribution of the light beams. In all cases, there is much reduced or no chromatic aberration that would arise from having to pass the light from the display through a gross refractive lens that handles all the pixels in one lens, and chromatic aberration does not occur in a reflector.

Figure 2:
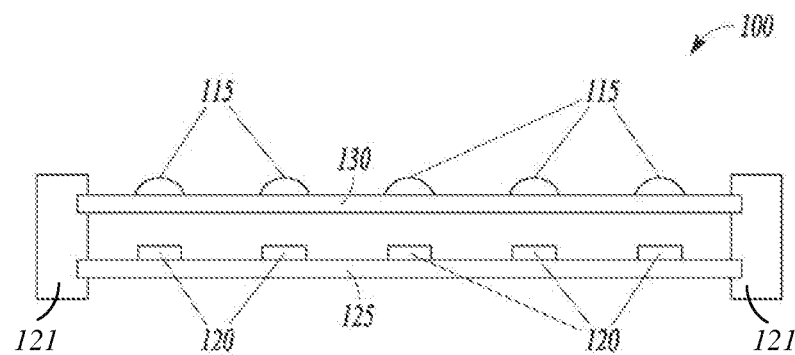
FIG. 2 is a block representation of a display assembly that includes a collimating pixel lens for each pixel according to an example embodiment.
Figure 3:
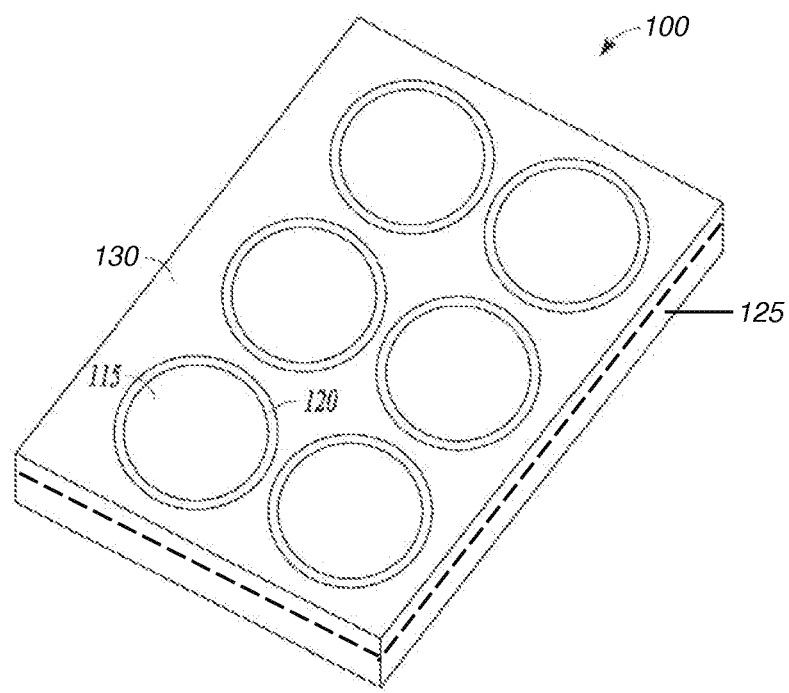
FIG. 3 is a perspective view of a display assembly that includes a collimating pixel lens for each pixel according to an example embodiment.

FIGS. 2 and 3 show a partial representation of a display assembly 100 including a pixel lens 115 for each pixel 120 of an image display system. By adjusting the collimation of a single pixel at a time, a set of collimated or partially collimated light beams is provided by the display assembly 100 that may then be manipulated with different light transmission and/or reflection devices without having to adjust diopter or collimation properties (or with less adjustment to diopter or collimation properties than would be otherwise needed), thus easing the construction of a nearto-the-eye display system. The near-to-the-eye display system may be mounted from one, two or three inches from the eye, or the image displayed by the system may be reflected from a surface which is one, two or three inches from the eye, as will be described in more detail below. Each pixel lens 115 is constructed to provide an amount of collimation correction appropriate to how close the display assembly 100 is intended to be held to the eye. The conglomeration of all the pixel lenses becomes an array of pixel lenses, one lens per light-emitting pixel, jointly combining to form an image when taken together as an array. The array will generally have many more pixel lenses than shown in FIGS. 1-3, such as hundreds of thousands or millions of pixel lenses.

In the embodiment illustrated in FIGS. 2 and 3, the pixels 120 are supported on a substrate 125. The pixel lenses 115 may be supported on or formed in a substrate 130 that allows light to pass through at least in the areas supporting the pixel lenses 115. Substrate 130 and corresponding pixel lenses 115 are supported a fixed distance from substrate 125 and pixels 120 in one embodiment. In FIG. 2, spacers 121 are used to achieve the desired spacing between the pixel lenses and the pixels. FIG. 3 shows an alternate embodiment in which substrate 130 is formed integral with substrate 125 and is thick enough to provide the desired separation of pixels 120 and pixel lenses 115.

Figure 23:
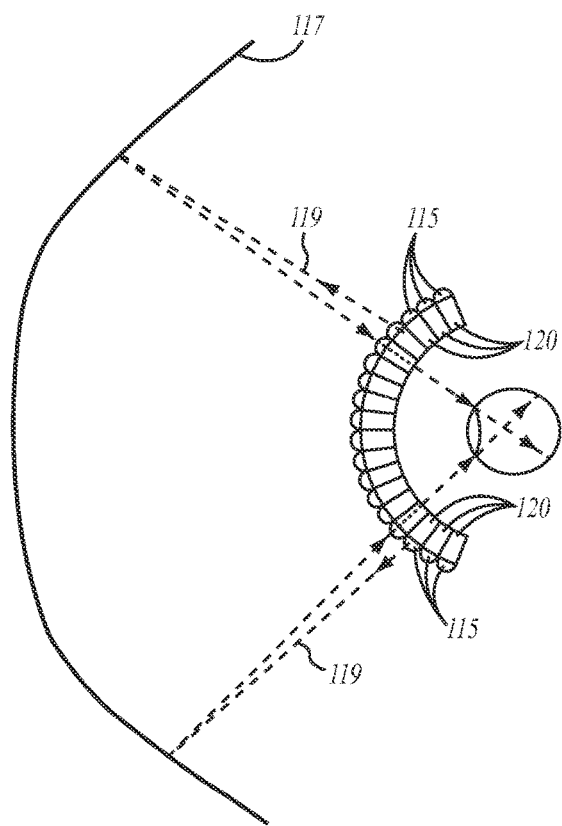
FIG. 23 is a top view of a convex display assembly according to one embodiment.

Although shown as being flat in FIGS. 1-3, the display assembly can be curved. For example, in the case of a direct view HMD, the display assembly can be concave towards the user's eye. As another example, as illustrated in FIG. 23, in the case of a HMD that employs a reflective surface, the display assembly can be convex, e.g., cylindrical, towards the reflective surface to spread the individual pixel beams 119 into a wider array and thus provide a wider field of view.

When the light is fully collimated by a pixel lens 115, the photon radiation from a pixel 120 will travel to the eye in a narrow pencil of light of approximately the same diameter as the pixel 120. This reduces the stray illumination internal to the viewer, makes the image brighter, and makes it easier to see the light from the image display system or transmitted in from the outside world. Specifically, in one embodiment of a head-mounted display apparatus employing pixel lenses, the rolling center of the eye is in a particular fixed location with respect to a given pixel 120, and through the use of a pixel lens, the pixel 120 can shine its light in one direction, satisfying the needs of the eye to look directly at the pixel 120 or to absorb the pixel's illumination as part of a wider field of view when the eye is pointing in a different direction. Looked at another way, because the light from each pixel 120 is collimated or substantially collimated, the amount of power needed to display the same amount of light to the user is reduced from that needed in the case of a system that does not use pixel lenses. In the case of a system that does not use pixel lenses, the pixels generate light which is dispersed in many directions that do not enter a user's eye, and, unless the stray light is absorbed, it becomes internal "light noise" interfering with the optical environment within the head-mounted display apparatus. Thus, in summary, the pixel lenses are configured to focus the light into a set of collimated (or substantially collimated) narrow beams, reducing stray emanations, and thus not requiring the extra power needed to generate extraneous unused emanations.

In some embodiments, no fixed relationship with the eyes is needed, especially where the pixel lenses 115 are set up to completely collimate the light emanating from the light-emitting pixels, in which case the pixels and pixel lenses can be put anywhere that the eye can see them. Partially-collimated systems may be displaced away from the eye by an amount which allows the user to see the displayed image, text, video or other graphic information in focus with or without substantial accommodation by the users eye. For example, by having the image at a finite distance of for example, 30 meters, as opposed to at infinity, the eye can be more relaxed (less accommodated) when viewing images.

In one embodiment, a television-style display system may be provided to the user, who can then watch video images as if the images came from a distance, since the waves are collimated, and, for example, walk through a landscape without having to refocus his/her eyes. The television display system may be placed anywhere in the user's field of view. If, for example, the display covers the entire field of view of the user, e.g., because it is very close to the user's eye, then the display controls what the user can see and objects can be made to appear close, far, or in-between. In other embodiments, if the display system is being used in an augmented-reality vision system, the display system should be positioned in order to have images appear in reality where the augmented reality system is designed to have them appear.

In some embodiments, there is no non-paraxial distortion of the image as occurs with prior devices that process light from a display through a lens construction that accommodates all the pixels. Since the pixels are already discretized to the smallest display unit that will be presented to the user, applying diopter-corrective lensing (i.e., a pixel lens 115) to that smallest unit alone avoids any non-paraxial aberrations and distortions otherwise associated with lensing. Also, since the light is collimated, the light path may easily be folded and directed with mirror assemblies since the mirror will no longer have to also perform collimation functions.

In one embodiment, the diopter prescription of each pixel lens 115 may be set to a custom level. In other embodiments, the display assembly 100 may be constructed in a curved manner, with the output of each pixel lens 115 focused to reflect in specific directions when it contacts a mirror. The use of a single pixel lens 115 corresponding exactly to one pixel 120 allows the creation of miniature displays that may be put right up to the eye and be seen with clarity. The pixel lenses 115 work directly with the pixels 120 to correct the diopter of each pixel 120.

Figure 4:
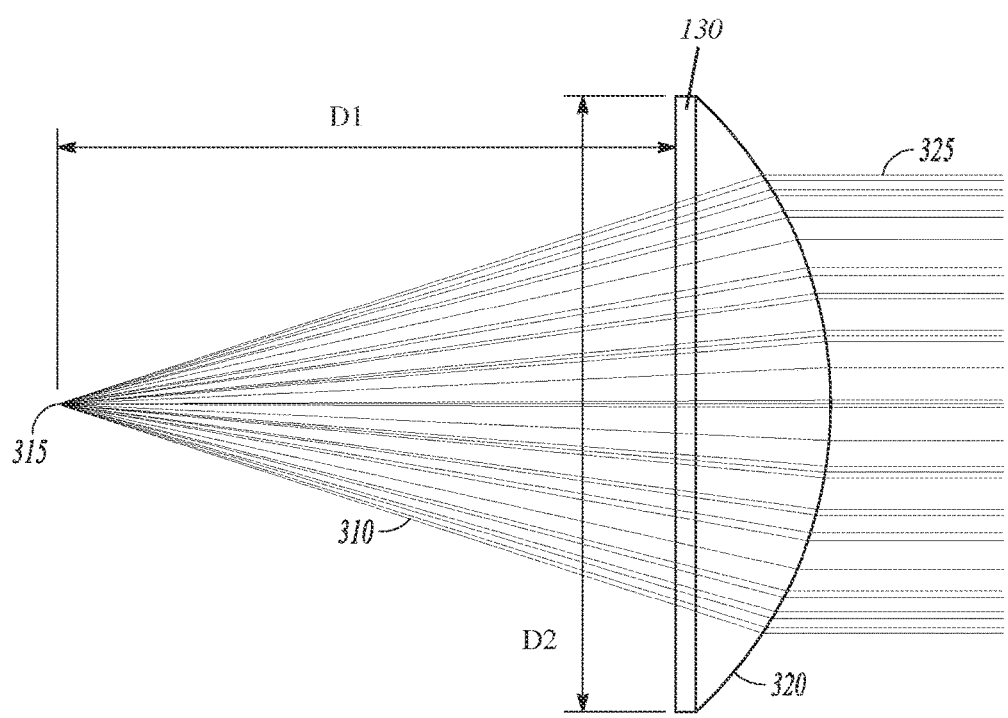
FIG. 4 is a ray diagram of light being collimated by a pixel lens according to an example embodiment.

FIG. 4 shows rays 310 having a large vergence emanating from a pixel 315 and entering a pixel lens 320 whose support substrate 130 is situated a distance D1 from the pixel, where the distance D1 is, for example, approximately 8 μm. The pixel lens 320 has a generally dome-shaped profile which is solid. In other words, the exiting surface of the pixel lens 320 is curved and the entering surface is essentially flat and integral with substrate 130. The flat side of the pixel lens 320 has a diameter D2, where D2 is, for example, approximately 8 μm. In this embodiment, the radius of curvature of the curved portion of lens 320 can be, for example, 5.45 μm. Exiting the lens 320 from the curved exiting surface are collimated waves 325, suitable for close-up viewing by the human eye. In further embodiments, the distance D1 from substrate 130 to the pixels 315, and the sizes of the lenses 320 and pixels 315, may be varied along with the corresponding curvatures of the lenses to provide the desired collimation of light. The dimensions and curvature of the pixel lens can be determined in various ways, a convenient approach being to use an optics modeling program, such as ZEMAX, and adjusting the parameters until a desired level of collimation is achieved.

Figure 5:
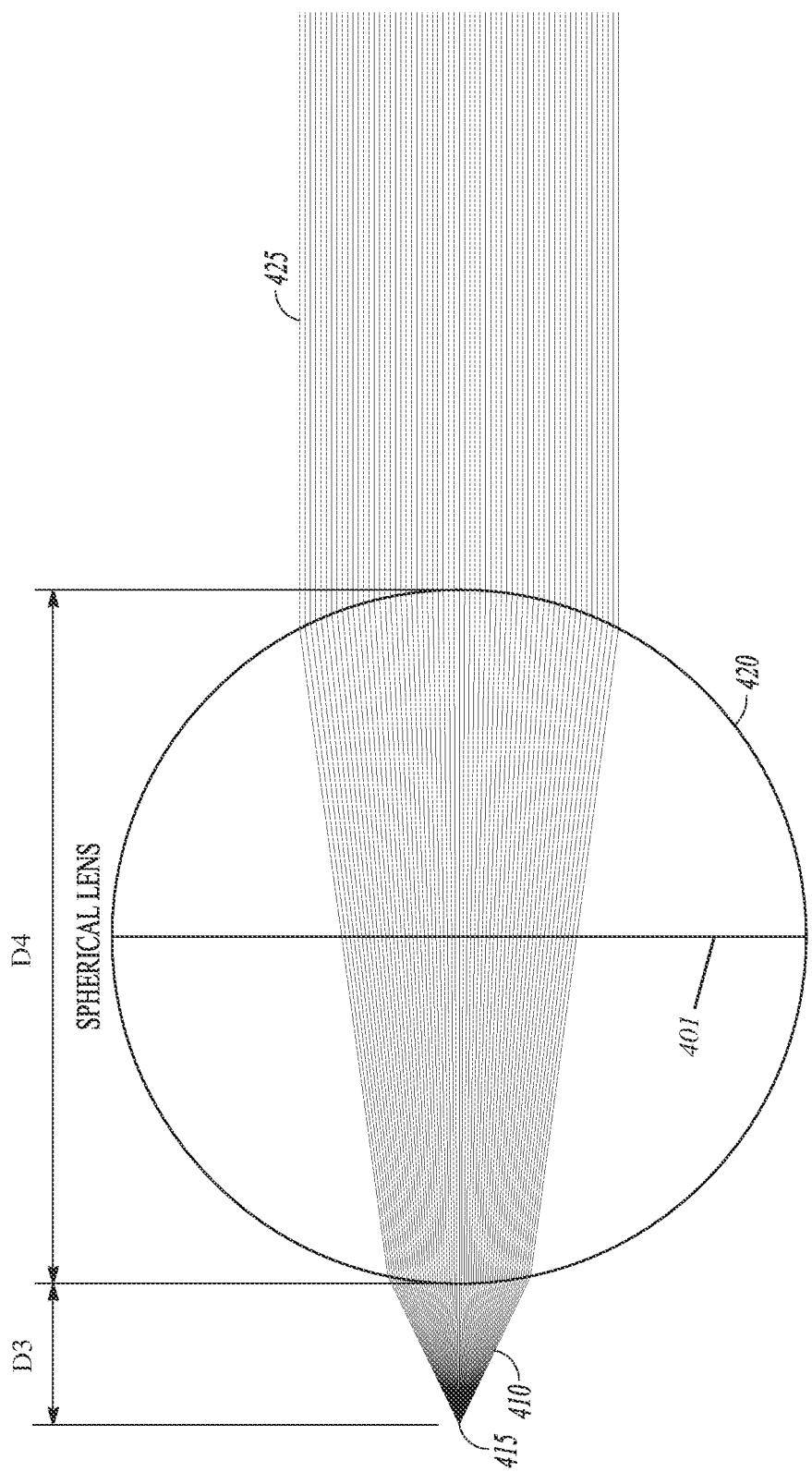
FIG. 5 is a ray diagram of light being collimated by an alternative pixel lens according to an example embodiment.

FIG. 5 is a ray diagram of light being collimated by an alternative pixel lens 420 according to an example embodiment. The rays 410 emanating from a pixel 415, having a large vergence at that distance, enter a spherically-shaped pixel lens 420 that is situated at distance D3 which is, for example, approximately 3.3 μm from pixel 415. In this case, the diameter D4 of the lens 420 can be, for example, approximately 8.7 μm. Exiting the lens 420 are collimated waves 425, suitable for close-up viewing. The display assembly in one embodiment is made up of an array of such pixels 415 and spherically-shaped lenses 420. The pixel lens 420 will normally be essentially solid. Such a lens may be easier to manufacture in some embodiments, as an integral unit with a substrate. In an embodiment, lens 420 has a center at the middle of midplane 401 which is aligned with pixel 415 such that the lens 420 is symmetrically placed in the path of rays 410 emanating from the pixel. An array of such spherically-shaped lenses can be formed, with one lens next to another, each lens having a center C aligned with a respective one pixel. As with the pixel lens of FIG. 4, the pixel lens of FIG. 5 can be designed in various ways, a convenient approach being to use an optics software program and vary one or more parameters of the display assembly, e.g., the location of the spherically-shaped lens relative to pixel 415, until a desired level of collimation is achieved.

FIGS. 4 and 5 illustrate two example pixel lenses that may be used. In further embodiments, the parameters of such lenses may be varied significantly, and distances from the pixels adjusted accordingly. The density of pixels and corresponding lenses may also be varied significantly depending on the desired resolution of the display.

The pixel lens arrays can be produced in a variety of ways, such as, through the use of various nano- and micro-manufacturing techniques. The lenses may be directly etched in a transparent media or created with nano-polishing machines. Microreplication through hot embossing can be used in some embodiments. Similar methods include micro injection molding, microthermoforming, and nanoimprinting. Thin-film technologies may be used in some embodiments to manufacture the lenses. For example, the pixel lenses can be made from semiconductor deposited optically-transparent material that is controlled and applied using thin-film semiconductor technology, among other means. In further embodiments, injection molding may be used. Direct chemical-optical etching as performed for semiconductors may be employed. Nanomachine lens polishers may be used to create each lens of the array. Custom polishing specifications can be applied to groups of pixel lenses and/or individual lenses. In general terms, the pixel lenses can be formed using the same types of fabrication methods as used for the creation of display devices, e.g., fabrication methods of the type used to manufacture liquid crystal displays (LCDs), light-emitting diodes (LEDs), organic light emitting diodes (OLEDs), or other image projection devices. Using such techniques, the density of lenses may be adjusted for high definition displays or lower resolution displays as desired.

Acrylic (plexiglas) plastic for diamond-turned prototype parts may be used in one embodiment. For molded parts, either acrylic or polycarbonate materials may be used, as an example. In general terms, the small pixel lenses may be made from the same types of materials that are used to produce Fresnel lenses having similarly sized features.

As illustrated in the following sections, in various embodiments, the combination of an array of pixel lenses and an array of light-emitting pixels may be integrated into head-mounted display apparatus in the form of, for example, glasses, goggles, or other forms suitable for holding display apparatus in a fixed relationship with one or both eyes of a user.

III. HMDs that Employ a Curved Reflective Optical Surface

As noted above, HMDs that employ a reflective optical surface and, in particular, a curved reflective optical surface, can be, for example, of the augmented-reality type. In such embodiments, the reflective optical surface will function as a beam splitter lens system that reflects an image formed by an image display system into the user's eye, while also allowing light from the external world to enter the eye. The two images are aligned through the use of appropriate localization equipment and software manipulation of computer-generated imagery to allow virtual images to apparently be placed into the external environment for the user to see.

In one embodiment, the beam splitter lens system has a controlled mapping of locations on the beam splitter lens system with directions to objects in an external environment. Such mapping is carried through to the pixels and made to be in alignment and registration with the external environment at a high rate of speed. Hence, motions of a user's head to different orientations with respect to the external environment will cause imagery to be generated and displayed which correctly augments the external environment wherein the imagery is displayed in the correct apparent location in the environment by illuminating the correct reflective locations on the beam splitter lens system.

The display system's surface and curvature with respect to the diopter shift provided by the pixel lenses may be manipulated in order to achieve approximately 0 diopter in all directions for imagery entering the eye from the display. The amount of diopter change in each pixel lens and in the reflector of the beam splitter lens system may also be adjusted as appropriate to support the head-mounted display design. A flat reflector will have no diopter change except with regards to the distance from the screen of the display system and the eye which changes diopter due to distance alone, i.e., the greater the distance from a light source, the less the light source's effective divergence and thus distance alone can change the effective diopter of light emanating from a display screen. Thus, the distances from the reflector to the eye and the display system can also be adjusted to optimize the clarity of the image being displayed by the head-mounted display device.

Figure 6:
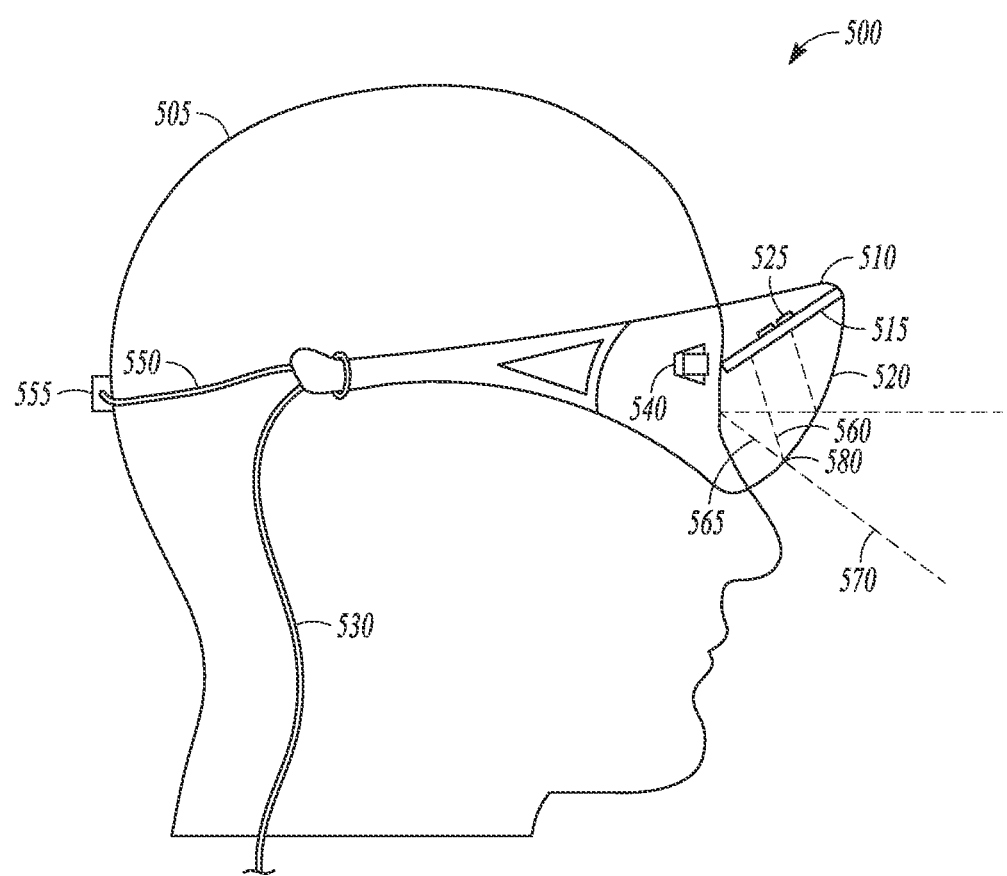
FIG. 6 is a side view of an augmented-reality head-mounted display apparatus having pixel lenses according to an example embodiment.
Figure 7:
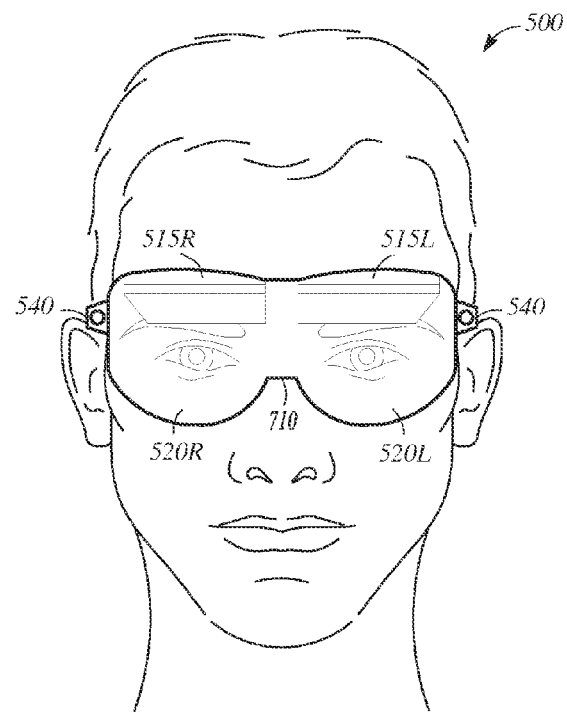
FIG. 7 is a front view of a user wearing the augmented-reality head-mounted display apparatus of FIG. 6.

With reference now to FIGS. 6 and 7, these figures show, respectively, a side view and a front view of a head-mounted display apparatus 500 shown being worn by a user 505. The head-mounted display apparatus employs a curved reflective optical surface, e.g., a FS/UWA/RO surface 520.

In one embodiment, the head-mounted display apparatus 500 can be, for example, an optical see-through, augmented reality, binocular viewer. Because an optical see-through, augmented reality, binocular viewer is typically the most complex form of a HMD, the present disclosure will primarily discuss embodiments of this type, it being understood that the principles discussed herein are equally applicable to optical see-through, augmented reality, monocular viewers, video see-through, augmented reality, binocular and monocular viewers, and binocular and monocular "virtual reality" systems.

As shown in FIGS. 6 and 7, the head-mounted display apparatus 500 includes a frame 510 adapted to be worn by the user and supported by the user's nose and ears in a manner similar to that in which eyeglasses are worn. In the embodiment of FIGS. 6-7, as well as in the other embodiments disclosed herein, the head-mounted display apparatus may have a variety of configurations and can, for example, resemble conventional goggles, glasses, helmets, and the like. In FIG. 6, elements 550 and 555 represent various forms of support which in some embodiments can be used to hold the HMD's frame in a desired position relative to the user's eyes. The support can, for example, be bands or cords which may be adjustable in some embodiments. In general terms, the outside surface of the HMD package can assume any form that holds the HMD's optical system in the required orientation with respect to the user's eyes.

As shown in FIGS. 6 and 7, the head-mounted display apparatus 500 includes: (a) at least one image display assembly 515, which includes an image display system and an array of pixel lenses, and (b) in one embodiment, a free space, ultra-wide angle, reflective optical surface 520, i.e., a FS/UWA/Ro surface 520, which by necessity is curved. Surface 520 can be purely reflective or can have both reflective and transmissive properties, in which case, it can be thought of as a type of "beam splitter."

Surface 520 is referred to herein as a "free space" surface because its local spatial positions, local surface curvatures, and local surface orientations are not tied to a particular substrate, such as the x-y plane, but rather, during the surface's design, are determined using fundamental optical principles (e.g., the Fermat and Hero least time principle) applied in three dimensional space. Surface 520 is referred to as an "ultra-wide angle" surface because, during use, at a minimum, it does not limit the dynamic foveal field of view of a nominal users eye. As such, depending on the optical properties of the display assembly with which the FS/UWA/RO surface is used, the overall optical system of the HMD can be non-pupil forming, i.e., unlike conventional optical systems that have an exit pupil which limits the user's field of view, the operative pupil for various embodiments of the optical systems disclosed herein will be the entrance pupil of the user's eye as opposed to one associated with the external optical system. Concomitantly, for these embodiments, the field of view provided to the user will be much greater than conventional optical systems where even a small misalignment of the user's eye with the exit pupil of the external optical system can substantially reduce the information content available to the user and a larger misalignment can cause the entire image to disappear.

FS/UWA/RO surface 520 may completely surround one or both eyes, as well as display assembly 515. In particular, the surface can curve around the sides of the eyes and toward the sides of the face so as to expand the available horizontal field of view. In one embodiment, the FS/UWA/RO surface 520 may extend up to 180° or more (e.g., more than 200°). As illustrated in FIG. 7, the HMD may include two separate FS/UWA/RO surfaces 520R and 520L for the user's two eyes which are separately supported by the frame and/or a nasal ridge piece 710 (see below). Alternately, the HMD may employ a single FS/UWA/RO surface that serves both eyes with a single structure, some portions of which are viewed by both eyes and other portions of which are viewed by only one eye.

As noted immediately above and as illustrated in FIG. 7, the head-mounted display apparatus 100 can include a nasal ridge piece 710. The nasal ridge piece can be a vertical bar or wall which provides a separation between two FS/UWA/RO surfaces, one for each of the user's eye. The nasal ridge piece 710 can also provide a separation between the fields of view of the user's two eyes. In this way, the user's right eye can be shown a first representation of three dimensional physical reality in the environment by displaying a first image to the right eye via a first display assembly 515R and a first FS/UWA/RO surface 520R, while the user's left eye is shown a second representation of three dimensional physical reality in the environment by displaying a second image to the left eye via a second display assembly 515L and a second FS/UWA/RO surface 5201L. A separate display assembly/reflective surface combination thus services each eye of the user, with each eye seeing the correct image for its location relative to the three dimensional physical reality in the environment. By separating the user's two eyes, the ridge piece 710 allows the image applied to each eye to be optimized independently of the other eye. In one embodiment, the nasal ridge piece's vertical wall may include two reflectors, one on each side, to allow the user to see imagery as he/she turns his/her eyes nasally, either to the left or to the right. Although illustrated in the context of a curved beam splitter, a nasal ridge piece can also be used with embodiments that employ non-curved (flat) beam splitters.

The at least one display assembly 515 can be mounted inside the FS/UWA/RO surface 520 and may be horizontally disposed or at a slight angle with respect to the horizon. Alternatively, the at least one display assembly can be located just outside of the FS/UWA/RO surface. The tilt or angle of the display assembly 515 or, more particularly, its at least one light-emitting surface, will in general be a function of the location of the pixels, images, and/or pieces of display information that are to be reflected from the surface 520. At whatever angle the display assembly is mounted, the pixel light needs to point towards the mirror, since it is a tightened beam and the off-center-axis beam power will be low.

In certain embodiments, the head-mounted display apparatus 500 is configured to create an interior cavity, with the FS/UWA/RO surface being reflective inward into the cavity. For a FS/UWA/RO surface having transmissive properties, the image or display information from the at least one display assembly is reflected into the cavity and to the user's eye from the surface while, simultaneously, light also enters the cavity and the user's eye from the external world by passing through the reflective surface.

The head-mounted display apparatus can include an electronics package 525 to control the images that are displayed by the at least one display assembly 515. In one embodiment, the electronics package 525 includes accelerometers and gyroscopes that provide location, orientation and position information needed to synchronize images from the at least one display assembly 515 with user activities. Power and video to and from the head-mounted display apparatus 500 can be provided through a transmission cable 530 coupled to the electronics package 525. Video and other information may also be provided via wireless medium where the electronics package 525 provides a transceiver.

A set of cameras 540 may be situated on opposite sides of the head-mounted display apparatus 500 to provide input to the electronics package, e.g., to software or firmware within the electronics package, to help control the computer generation of, for example, "augmented reality" scenes. The set of cameras 540 may be coupled to the electronics package 525 to receive power and control signals and to provide video input to the electronics package's software.

In operation, the electronics package 525, including the accelerometers and/or gyroscopes, and optionally a global positioning system (GPS) module, can provide location, orientation and position information to synchronize images on the at least one display assembly 515 to user activities.

The information is used by the electronics package 525 to register where the device's frame 510 is in the physical reality and to superimpose its images on the outside view. In some embodiments, feedback from cameras 540 may be used by the electronics package 525 to synchronize the images displayed with the reality viewed. This may be accomplished by aligning terrain, or explicitly positioned targets, occurring in reality as provided by the cameras 540 with stored terrain and known positions of displayed images with respect to the stored terrain. Once the terrains are aligned, the images may be placed on the display screen such that they are included in the field of view and appear in the real terrain as intended.

As noted above, the image display system used in the head-mounted display apparatus can take many forms, now known or subsequently developed. For example, the system can employ small high resolution liquid crystal displays (LCDs), light emitting diode (LED) displays, and/or organic light emitting diode (OLED) displays, including flexible OILED screens. In particular, the image display system can employ a high-definition small-form-factor display device with high pixel density, examples of which may be found in the cell phone industry. A fiber-optic bundle can also be used in the image display system. In various embodiments, the image display system can be thought of as functioning as a small screen television. If the image display system produces polarized light (e.g., in the case where the image display system employs a liquid crystal display where all colors are linearly polarized in the same direction), and if the FS/UWA/RO surface is polarized orthogonally to the light emitted by the display, then light will not leak out of the FS/UWA/RO surface. The information displayed and the light source itself will accordingly not be visible outside of the HMD.

Overall operation of an exemplary embodiment of an optical system constructed in accordance with the present disclosure, specifically, an optical system for an "augmented reality" HMD, is illustrated by the ray-tracings of FIG. 6, specifically, light rays 560, 565, and 570. In this embodiment, FS/UWA/RO surface 520 has both reflective and transmissive properties. Using surface 520's transmissive properties, light ray 570 enters from the environment through the surface and proceeds towards the user's eye. From the same region of surface 520, light ray 560 is reflected by the surface (using the surface's reflective properties) and joins light ray 570 to create combined light ray 565 that enters the user's eye when the user looks in the direction of point 580, i.e., when the user's direction of gaze is in the direction of point 580. While so looking, the user's peripheral vision capabilities allow the user to see light from other points in the environment which pass through surface 520, again using the surface's transmissive properties. In particular, the user's peripheral vision capabilities allow the user to see light further distant laterally and vertically from just around point 580, across the surface of the beam splitter lens system 520.

Figure 8:
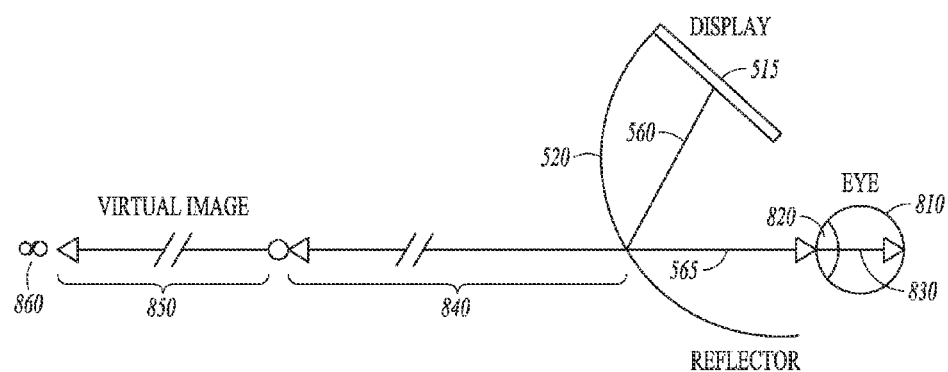
FIG. 8 is a diagram illustrating light paths for the augmented-reality head-mounted display apparatus of FIGS. 6 and 7.

As seen in FIG. 8, wherein the reference numbers are the same for like elements of FIGS. 5, 6, and 7, the vision system consists of three parts, the display assembly 515, the beam splitter lens system 520, and the eye 810. With regard to the display assembly, the beam splitter lens system 520 functions as a reflector. The eye 810 has an internal lens 820. The light ray 560 is emitted from a pixel on the at least one display system of assembly 515 and is collimated (or partially collimated) by the associated pixel lens of the assembly. The light ray 560 will appear at a point on the retina of the eye, after being reflected by the beam splitter lens system 520 and is illustrated as the light rays 565 and 830. The term light ray here means a surface normal to the wavefront of light emanating from the source, and taking the shortest optical path from the emitter to the detector, in this ease the retina. What the eye sees, however, is a virtual image that appears in the space ahead of it, at a distance represented by vectors 840 and 850. For a virtual image at infinity 860 the ray distance is the sum of vectors 840 and 850. The mirror/beam splitter of the beam splitter lens system 520 is shown as curved in this representation, but may be flat. If the mirror is curved then the diopter correction provided by the mirror must be subtracted from the diopter correction supplied, by the pixel lenses in order to allow the eye to focus on the image.

Figure 9:
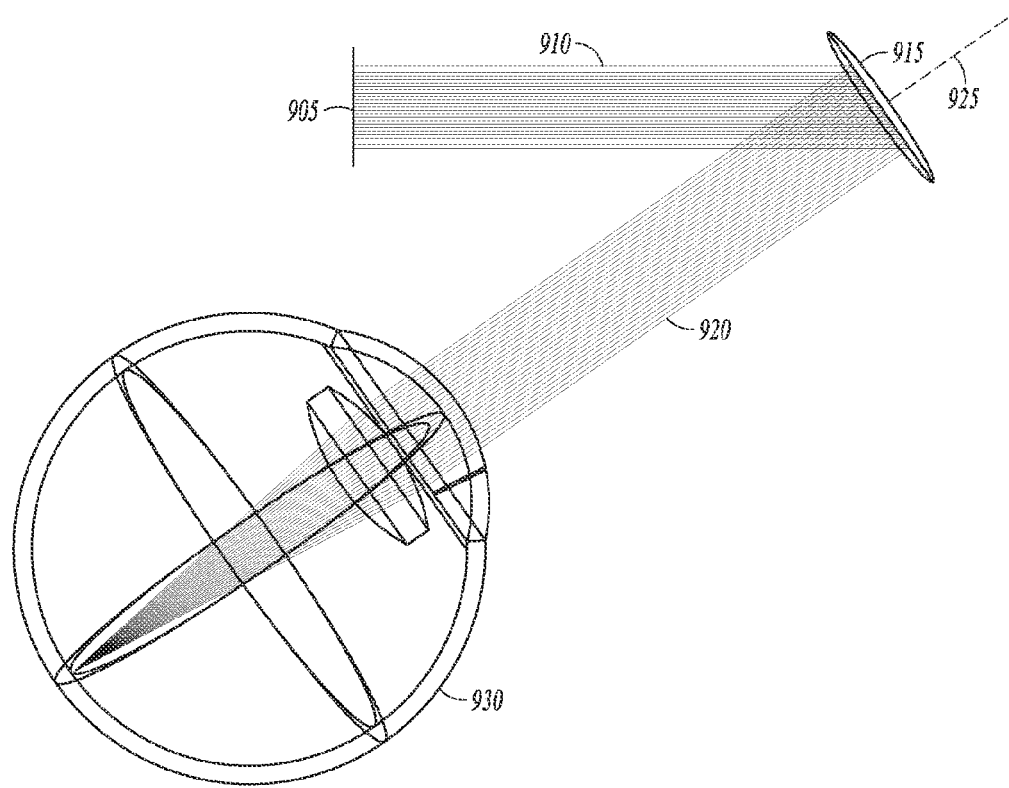
FIG. 9 is a ray diagram illustrating light rays for an augmented-reality head-mounted display apparatus having pixel lenses according to an example embodiment.

A ray tracing in FIG. 9 illustrates a diverging wavefront of light emanating from a pixel of a display assembly 905 that is collimated before leaving the assembly and emerges as 0 (zero) diopter light 910 to a reflective mirror or beam splitter 915. There is no divergence, or very little at this point and also in a reflected beam 920. The light beam could also go directly into an eye 930 and be focused upon at this point. In the embodiment shown here, the reflected, beam 920 is reflected off the reflective mirror or beam splitter 915 and travels toward the pupil of the eye. This is equivalent to light coming from a point essentially infinitely distant represented by line 925, and the light wavefront is flat resulting in parallel surface normals to the wavefront, shown as reflected beam 920, across the entrance pupil to the eye 930.

Figure 10:
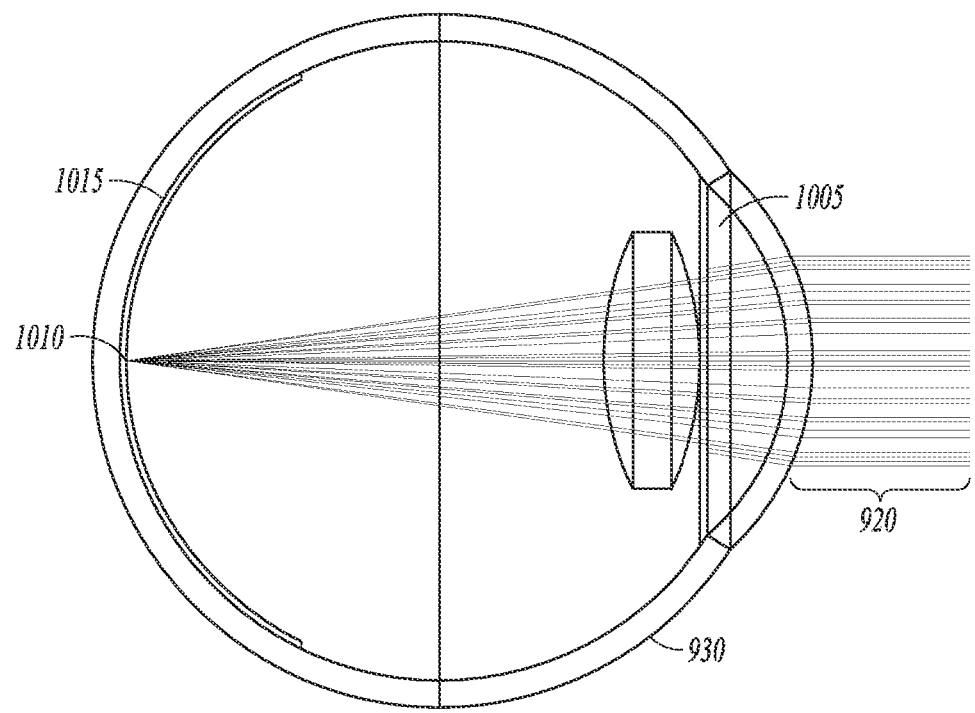
FIG. 10 is a ray diagram illustrating light rays entering an eyeball according to an example embodiment.

FIG. 10 illustrates collimated parallel reflected beam 920 entering the eye 930 through the pupil 1005 and being focused at point 1010 on the fovea of retina 1015 where the highest acuity of vision takes place. The surrounding retina responds to the wider field of view hut with a lower acuity. Also entering the eye from this direction may be light from a surrounding external environment that is joined with the augmented imagery provided by the collimated pixel-emitted light.

As discussed above, prior optical systems used in HMDs that have employed reflective optical surfaces have been pupil forming and thus have had limited viewing areas, a typical field of view being ~60 degrees or less. This has greatly limited the value and capability of prior head-mounted display apparatuses, in various embodiments, the head-mounted displays disclosed herein have much wider fields of view (FOV), thus allowing much more optical information to be provided to the user compared to HMDs having smaller fields of view. The wide field of view can be greater than 100°, greater than 150°, or greater than 200°. In addition to providing more information, the wide field of view allows the additional information to be processed by the user in a more natural manner, enabling better immersive and augmented reality experiences through a better match of the displayed images to physical reality.

Figure 11:
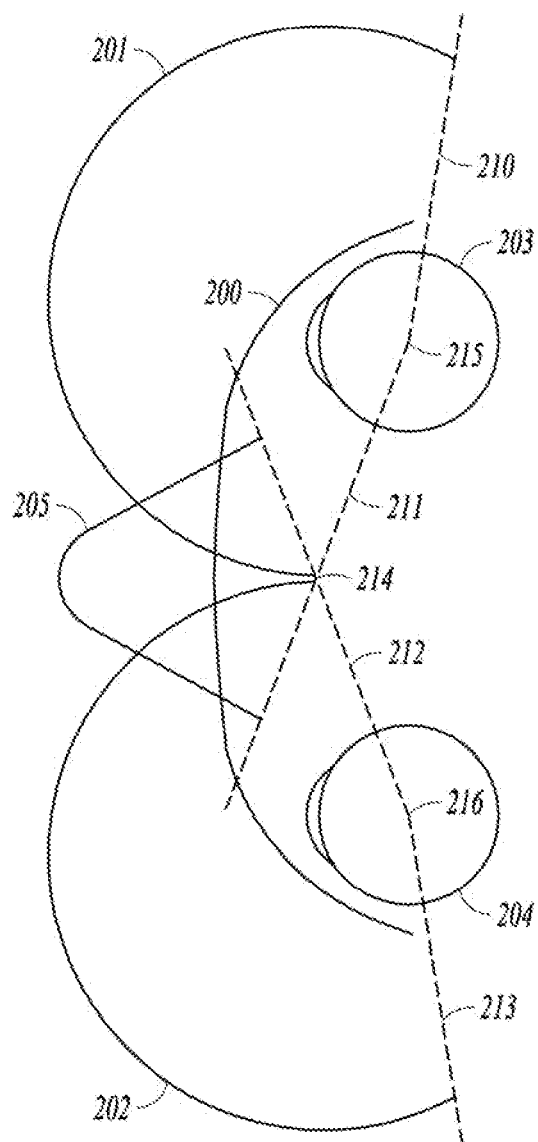
FIG. 11 is a top view of a head-mounted display apparatus illustrating the use of two curved reflective optical surfaces corresponding to the two eyes of a user according to an example embodiment.

Specifically, in the exemplary embodiment illustrated in FIG. 11, for a straight ahead direction of gaze, the eye is able to take in a whole viewing area represented in FIG. 11 by curved FS/UWA/RO surfaces 201 and 202, corresponding to at least 150 degrees of horizontal field of view (FOV) for each eye (e.g., ~168 degrees of horizontal FOV). This field of view is composed of the eye's foveal field of view and its peripheral field of view. In addition, the eye is allowed to move freely about its center of rotation to aim the combined foveal+peripheral field of view in different directions of gaze, as the eye naturally does when viewing the physical world. The optical systems disclosed herein thus allow the eye to obtain information throughout a range of motion in the same manner as the eye does when viewing the natural world.

Examining FIG. 11 in more detail, this figure is a simplified line representation of the front of a user's head 200 as seen from the top. It shows FS/UWA/RO surfaces 201 and 202 placed in front of the user's eyes 203 and 204. As discussed above, the FS/UWA/RO surfaces 201 and 202 may rest upon the user's nose 205 where they come together at the center front 214 of the user's head 200. As discussed in detail below, the local normals and local spatial locations of surfaces 201 and 202 are adjusted so that images produced by the at least one display assembly (not shown in FIG. 11) cover at least 100°, e.g., in certain embodiments, at least 150° and, in other embodiments, at least 200°, of horizontal FOV for each eye, where, as discussed above, the 100°, 150°, and 200° fields of view correspond generally to a nominal user's foveal dynamic field of view, foveal+ peripheral static field of view, and foveal+peripheral dynamic field of view, respectively. As also discussed below, the local radii of curvature are also adjusted to provide distant virtual images when the optical effects of the curved reflective surface are combined with the optical effects of the pixel lenses. For example, the local normals and local spatial locations can be adjusted to cover the user's complete ~168 degree, straight ahead, horizontal, static field of view for each eye, with the 168 degrees extending from edge-to-edge of the FS/UWA/RO surfaces 201 or 202, as shown by sight lines 210,211 and 212,213. The sight lines thus correspond to the wide static field of view (foveal+peripheral) that is provided to the user. In addition, the user is free to move his/her eyes around rolling centers 215 and 216 while continuing to see computer-generated imagery.

Figure 17:
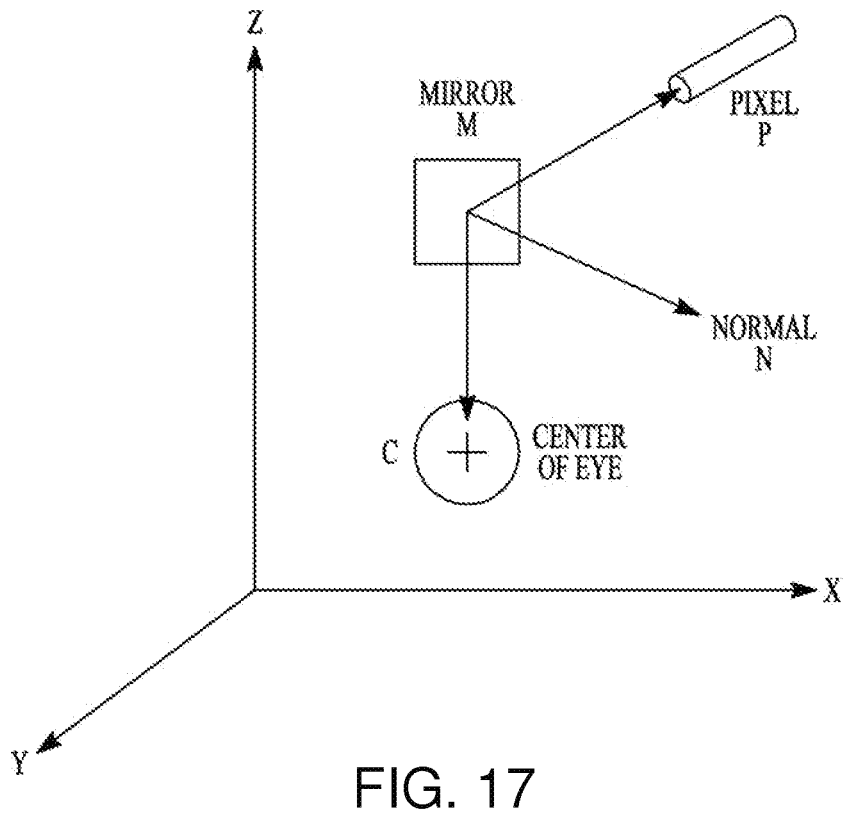
FIG. 17 is a diagram illustrating variables used in selecting the direction of the local normal of a reflector according to an example embodiment.
Figure 18:
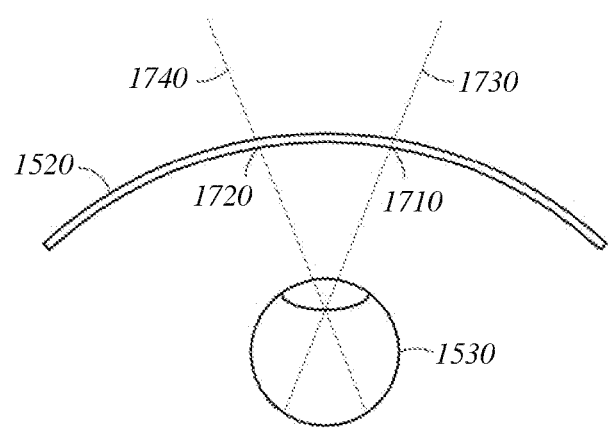
FIG. 18 is a representation of a curved reflector along with light paths according to an example embodiment.

In FIG. 11, as well as in FIG. 18, the FS/UWA/RO surfaces are shown as parts of spheres for ease of presentation. In practice, the surfaces are not spheres, but have more complex configurations so that their local normals, local spatial locations, and local radii of curvature will provide the desired static and dynamic fields of view and desired distances to the virtual images. Also, in FIG. 11, the right side of the head-mounted display apparatus operates identically to left side, it being understood that the two sides can differ if desired for particular applications. Also for ease of presentation, FIGS. 11-18 do not show an optical system which includes pixel lenses between the at least one image display system and the reflective optical surface, it being understood that in accordance with the present disclosure, such lenses are used in the embodiments disclosed herein.

Figure 12:
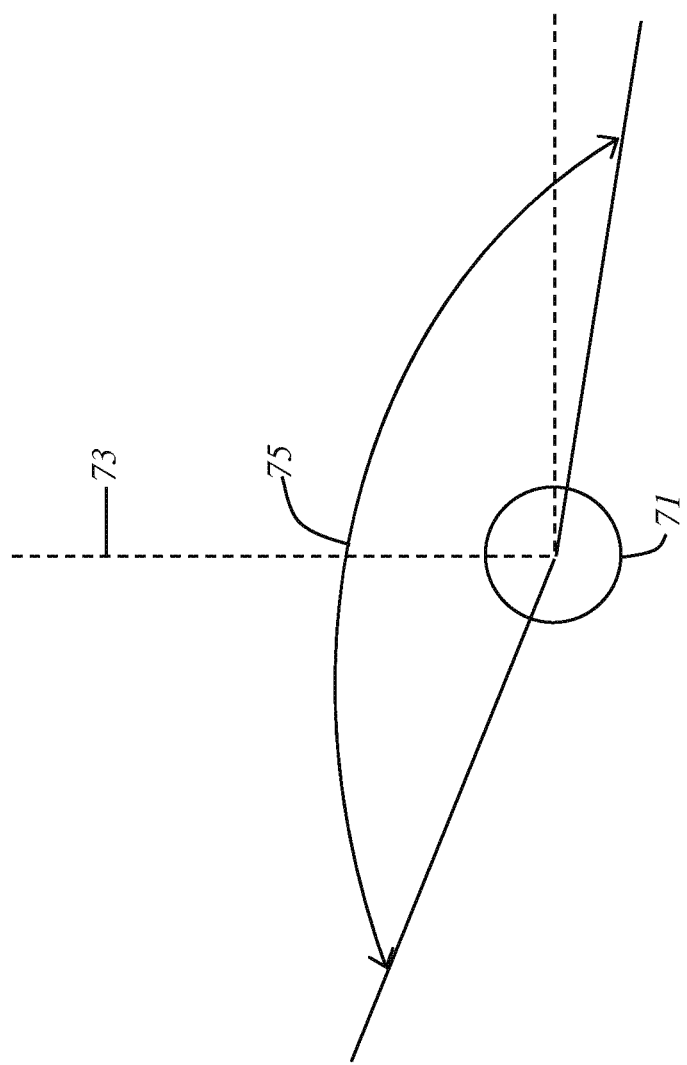
FIG. 12 is a schematic diagram illustrating a static field of view of a nominal human eye for a straight ahead direction of gaze.
Figure 13:
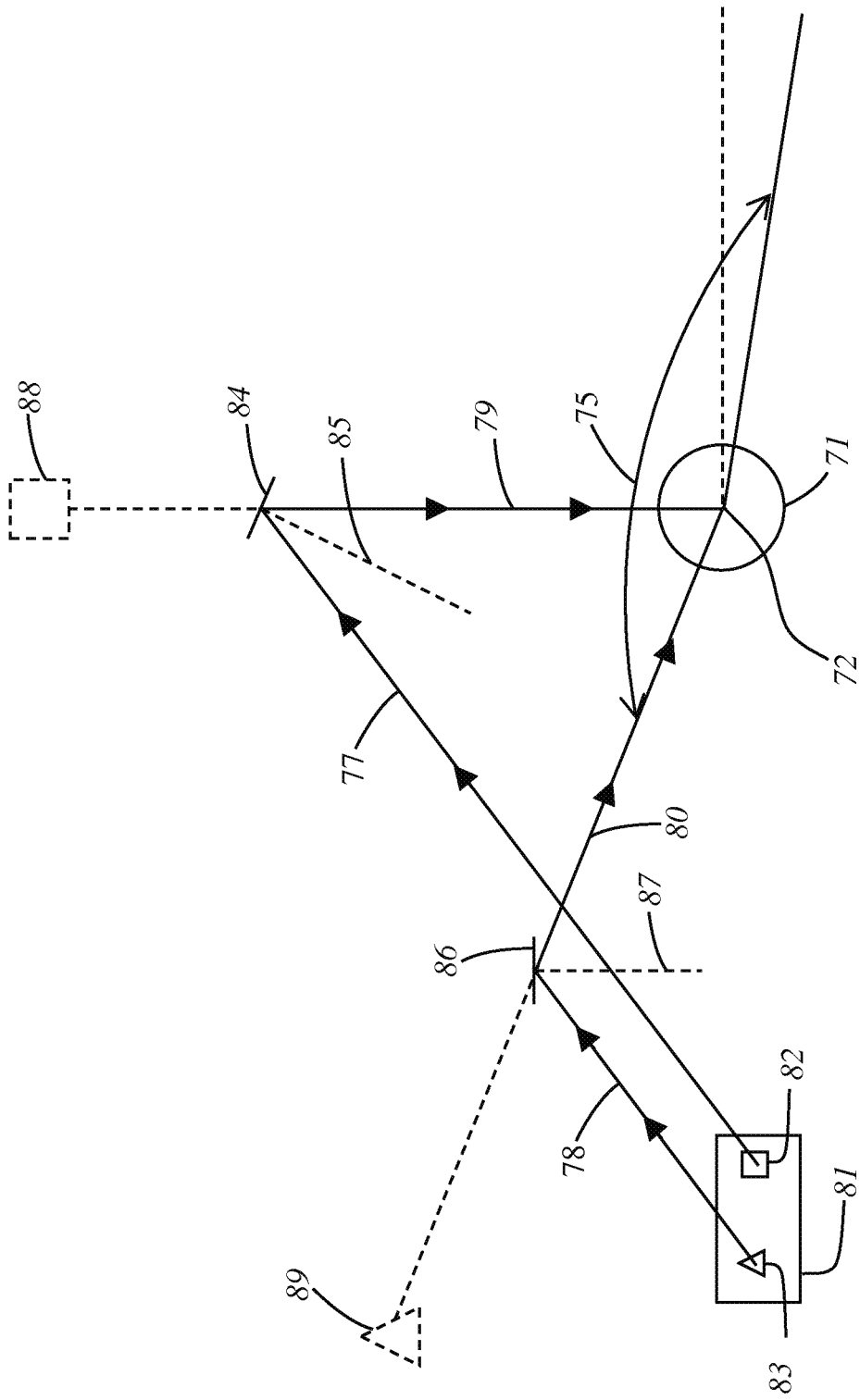
FIG. 13 is a schematic diagram illustrating the interaction between the static field of view of FIG. 12 with a FS/UWA/RO surface according to an example embodiment. The arrows in FIG. 13 illustrate directions of light propagation.

FIGS. 12 and 13 further illustrate the static and dynamic fields of view provided by the FS/UWA/RO surfaces disclosed herein. FIG. 12 shows a user's nominal right eye 71 having a straight ahead direction of gaze 73. The eye's foveal+peripheral field of view is shown by arc 75, which has an angular extent of ~168°. Note that for ease of presentation, in FIGS. 12-13, the field of view is shown relative to the center of rotation of the user's eye as opposed to the center or edges of the user's pupil. In fact, the large field of view (e.g., ~168°) achieved by a human eye is a result of the large angular extent of the retina which allows highly oblique rays to enter the user's pupil and reach the retina.

FIG. 13 schematically shows the interaction of the field of view of FIG. 12 with a HMD having: (a) an image display system whose at least one light-emitting surface 81 has a first light-emitting region 82 (illustrated as a square) and a second light-emitting region 83 (illustrated as a triangle) and (b) a FS/UWA/RO surface having a first reflective region 84 which has a first local normal 85 and a second reflective region 86 which has a second local normal 87.

As indicated above, the FS/UWA/RO surface is both a "free space" surface and an "ultra-wide angle" surface. In addition, as noted above and discussed in more detail below, the surface can participate in collimation (or partial collimation) of the light that enters the user's eye. Such collimation causes the virtual image produced by the FS/UWA/ RO surface and the pixel lenses to appear to be located at, for example, a long distance from the user, e.g., 30 meters or more, which permits the user to easily focus on the virtual image with a relaxed eye.

The "free space" and "ultra-wide angle" aspects of the FS/UWA/RO surface can be achieved by adjusting the local normals of the surface so that the user's eye sees light-emitting regions of the at least one image display system as coming from predetermined regions of the FS/UWA/RO surface (predetermined locations on the surface).

For example, in FIG. 13, the designer of the HMD might decide that it would be advantageous for a virtual image 88 of the square to be viewed by the center portion of the user's retina when the user's direction of gaze is straight ahead and for a virtual image 89 of the triangle to be viewed by the center portion of the user's retina when the direction of gaze is, for example, ~50° to the left of straight ahead. The designer would then configure the at least one image display system, the FS/UWA/RO surface, the pixel lenses and any other optical components of the system so that the virtual image of the square would be straight ahead and the virtual image of the triangle would be 50° to the left of straight ahead during use of the HMD.

In this way, when the user's direction of gaze (line of sight) intersected the FS/UWA/RO surface straight on, the virtual image of the square would be visible at the center of the user's eye as desired, and when the user's direction of gaze (line of sight) intersected the FS/UWA/RO surface at 50 degrees to the left of straight ahead, the virtual image of the triangle would be visible at the center of the user's eye, as also desired. Although not illustrated in FIGS. 12 and 13, the same approaches are used for the vertical field of view, as well as for off-axis fields of view. More generally, in designing the MID and each of its optical components, the designer "maps" the at least one light-emitting surface of the display to the reflective surface so that desired portions of the display are visible to the user's eye when the eye's gaze is in particular directions. Thus, as the eye scans across the field of view, both horizontally and vertically, the FS/UWA/ RO surface shines different portions of the at least one light emitting surface of the image display system into the user's eye. Although the foregoing discussion has been in terms of the center of a nominal user's retina, the design process can, of course, use the location of a nominal user's fovea instead, if desired.

It should be noted that in FIG. 13, any rotation of the user's eye to right causes the virtual image 89 of the triangle to no longer be visible to the user. Thus, in FIG. 13, any direction of gaze that is straight ahead or to the left of straight ahead provides the user with virtual images of both the square and the triangle, while a direction of gaze to the right of straight ahead provides a virtual image of only the square. The acuity of the virtual images will, of course, depend on whether the virtual images are perceived by the user's foveal vision or the user's peripheral vision.

If the designer of the HMD had placed the virtual image of the square far to the right in FIG. 13 while leaving the virtual image of the triangle far to the left, there would be directions of gaze where only the virtual image of the square was visible and other directions of gaze where only the virtual image of the triangle was visible. Likewise, based on the principles disclosed herein, the designer could arrange the virtual image of the square and the virtual image of the triangle so that the virtual image of the triangle was always visible, with the virtual image of the square being visible for some directions of gaze, but not for others. As a further variation, the designer of the HMD could place the virtual image of the square and triangle at locations where for one or more directions of gaze, neither image was visible to the user, e.g., the designer could place the virtual images just outside the user's static field of view for a straight ahead direction of gaze. The flexibility provided to the HMD designer by the present disclosure is thus readily apparent.

In one embodiment, the "free space" and the "ultra-wide angle" aspects of the reflective surface are achieved by using the principles of Fermat and Hero pursuant to which light travels along the shortest (least time) optical path. Commonly-assigned and co-pending U.S. patent application Ser. No. 13/211,389, filed on Aug. 17, 2011 in the names of G. Harrison, D. Smith, and G. Wiese, entitled "Methods and Systems for Creating Free Space Reflective Optical Surfaces," the contents of which are incorporated herein by reference, describes an embodiment in which the Fermat and Hero principles are used to design FS/UWA/RO surfaces suitable for use in HMDs. See also commonly-assigned and co-pending U.S. patent application Ser. No. 13/211,372, filed on Aug. 17, 2011 in the names of G. Harrison, D. Smith, and G. Wiese, entitled "Head-Mounted Display Apparatus Employing One or More Reflective Optical Surfaces," the contents of which are also incorporated herein by reference By means of the Fermat and Hero least-time principles, any "desired portion" of the at least one light-emitting surface of an image display system (e.g., any pixel of an image display system) can be caused to have any desired point of reflection at the FS/UWA/RO surface, provided that the optical path from the desired portion of the at least one light-emitting surface to the point of reflection at the FS/UWA/RO surface and then to the center of rotation of the user's eye is at an extremum.

Figure 14:
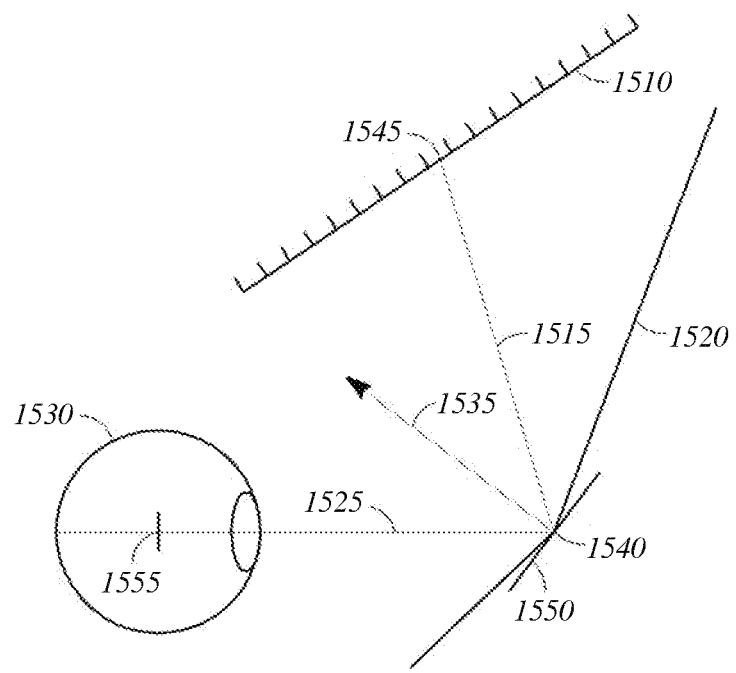
FIG. 14 is a ray diagram illustrating a light path from a given pixel on a display as it is reflected toward an eye according to an example embodiment.
Figure 16:
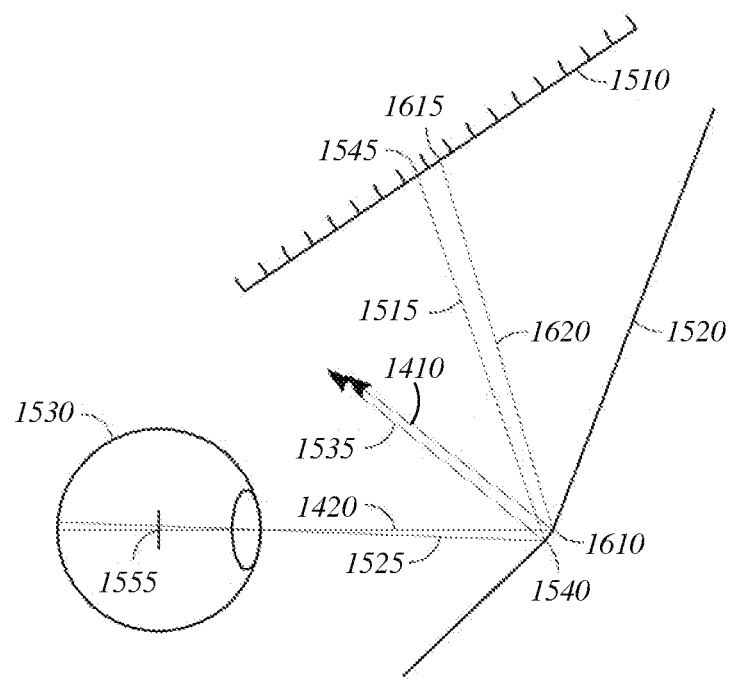
FIG. 16 is a ray diagram illustrating light paths from two pixels on a display as they are reflected toward an eye according to an example embodiment.
Figure 15:
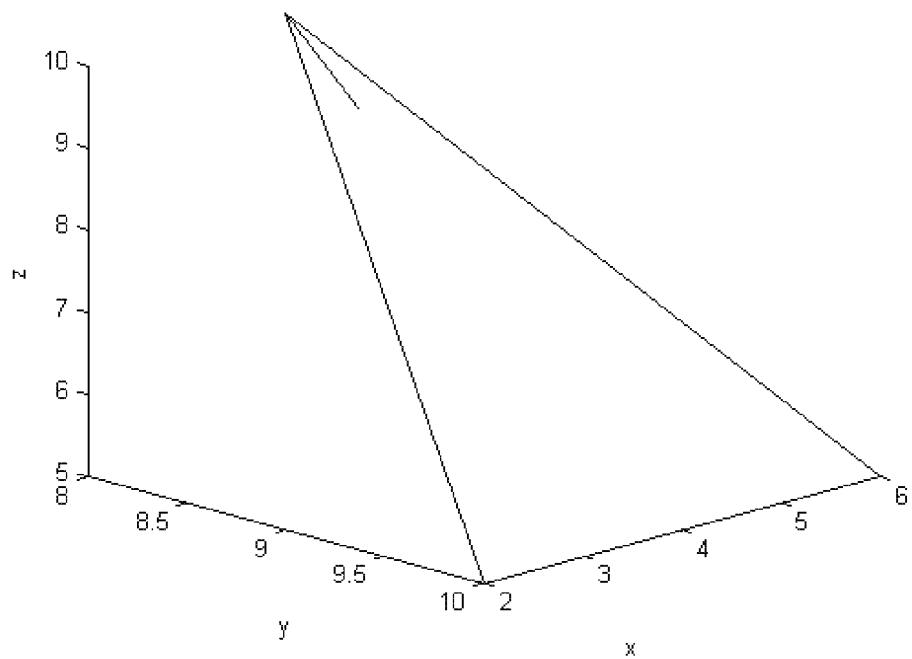
FIG. 15 is a schematic diagram illustrating geometry for calculating a local normal to a reflective surface according to an example embodiment.

An extremum in the optical path means that the first derivative of the optical path length has reached a zero value, signifying a maximum or a minimum in the optical path length. An extremum can be inserted at any point in the field of view by creating a local region of the reflective optical surface whose normal bisects (a) a vector from the local region to the user's eye (e.g., a vector from the center of the local region to the center of the user's eye) and (b) a vector from the local region to the "desired portion" of the light-emitting surface (e.g., a vector from the center of the local region to the center of the "desired portion" of the light-emitting surface). FIGS. 14-16 illustrate the process for the case where the "desired portion" of the at least one light-emitting surface of the image display system is a pixel.

Specifically, FIG. 14 shows a light-emitting surface 1510 of an image display system composed of a generally rectangular array of pixels that are emanating light toward the front of a head-mounted display apparatus in the direction of light beam 1515. Light beam 1515 bounces off of reflective optical surface 1520, which for ease of presentation is shown as a flat in FIG. 14. Upon reflection, light beam 1515 becomes light beam 1525 that enters the user's eye 1530.

For the purposes of determining the surface normal of the reflector for each pixel, it is only necessary to determine the three-dimensional bisector of vectors corresponding to light beams 1515 and 1525. In FIG. 14, this bisector vector is shown in two-dimensional form as line 1535. Bisecting vector 1535 is normal to the reflective optical surface at point of reflection 1540, which is the location on surface 1520 where pixel 1545 of light-emitting surface 1510 will be visible to the user of the HMD.

Specifically, in operation pixel 1545 in the display surface 1510 emits light beam 1515 that bounces off reflective optical surface 1520 at an angle established by the surface normal corresponding to bisecting vector 1535 and its perpendicular plane 1550, yielding by the Fermat and Hero principles, a reflected pixel at point of reflection 1540 that is seen by the eye 1530 along light beam 1525. In order to accurately calculate the surface normal at the point of reflection 1540, the beam 1525 can pass through approximately the center 1555 of the user's eye 1530. The results will remain approximately stable even if the user's eye rotates, becoming peripheral vision until, as discussed above in connection with FIGS. 12 and 13, the eye turns so much that that region of the display cannot be seen with either the user's foveal or peripheral vision.

To calculate the position of the surface normal, the use of the method of quaternions may be employed, where $q1$=orientation of beam 1515

$q2$=orientation of beam 1525 and $q3$=the orientation of the desired surface normal
$1535=(q1+q2)/2$

The surface normal may also be described in vector notation, as illustrated in FIG. 17. In the following equation and in FIG. 17, point N is one unit away from the point M at the center of the region of interest of the reflective optical surface and is in the direction of the perpendicular normal to the tangent plane of the reflective optical surface at the point M. The tangent plane of the reflective optical surface at point M is controlled to satisfy the relation expressed in the following equation such that in three-dimensional space, the surface normal at the point M bisects the line from the point M to the point P at the center of the pixel of interest and the line from point M to the point C at the rolling center of the user's eye (for reference, point C is approximately 13 mm back from the front of the eye).

The equation describing the point N on the surface normal at point M is:

$$N = \frac{(P-M)+(C-M)}{|(P-M)+(C-M)|} + M$$

where all the points, N, M, P, and C have components [x, y, z] that indicate their position in three-dimensional space in an arbitrary Cartesian coordinate system.

The resulting normal vector N-M has the Euclidean length $|N-M|=1$ where the two vertical bars represents the Euclidean length, calculated as follows:

$|N-M|=\sqrt{(x_N-x_M)^2+(y_N-y_M)^2+(z_N-z_M)^2}.$

As a numerical example, consider the following M, P, and C values:

$M=[x_M,y_M,z_M]=[4,8,10]$ $P=[2,10,5]$ $C=[6,10,5]$

The point along the normal, N, is calculated as follows;

$P-M=[(2-4),(10-8),(5-10)]=[-2,2,-5]$ $C-M=[(6-4),(10-8),(5-10)]=[2,2,-5]$ $(P-M)+(C-M)=[0,4,-10]$ and $$N = \frac{(P-M)+(C-M)}{|(P-M)+(C-M)|} + M$$

$$= \frac{\{[-2, 2, -5] + [2, 2, -5]\}}{10.7703296143 + [4, 8, 10]}$$

$$= [0, 0.3713806764, -0.928476691] + [4, 8, 10]$$

$$= [4, 8.3713806764, 9.0715233091]$$

The geometry is shown in FIG. 15, where the bisector is between the two longer vectors.

The foregoing is, of course, merely a representative calculation serving to show the use of the Fermat and Hero principles of least time in determining local tangent plane angular constraints for a field of points making up a free-space (free-form) surface manifold of reflecting regions intended to present a contiguous virtual image to the viewer. The only real constant is the center of the user's eye, and the eye's natural field of view. All other components may be iteratively updated until an appropriate solution for a given image display system and reflective optical surface orientation is reached. Looked at another way, the pixel image reflection locations, M1, M2, . . . , Mn, and their associated normals and curvatures may be thought of as a matrix that is "warped" (adjusted) so that the FS/UWA/RO surface achieves the desired virtual image processing of computer-generated images formed by the image display system.

In applying the Fermat and Hero principles, it should be noted that in some embodiments, it will be desirable to avoid the situation where the normals are adjusted such that the user sees the same pixel reflection at more than one point. It should also be noted that in some embodiments, the local regions of the reflective optical surface can be very small and may even correspond to a point on the reflector, with the points morphing into other points to make a smooth surface.

To facilitate the presentation, the effects of the presence of pixel lenses has not been explicitly included in the above discussion of the use of the Fermat and Hero principles to design a FS/UM/A/RO surface. In practice, the presence of pixel lenses is readily included, in the analysis by using as the input to the Fermat and Hero calculations, the directions of propagation of the light beams after they have passed through the pixel lenses (and any other optical elements used in the overall optical system). Those directions of propagation can, for example, be determined using Gaussian optics techniques. If desired, the Fermat and Hero calculations can be repeated for different initial light vergence settings as controlled by changing the lensing power of the pixel lenses until desired virtual images are obtained.

In order to ensure that the user can easily focus on the virtual image of the "desired portion" of the at least one light-emitting surface (e.g., the virtual image of a pixel), in certain embodiments, the radius of curvature of the region surrounding the reflection point (reflection area) is controlled so that after passing through the pixel lenses and reflecting from the FS/UWA/RO surface, a collimated (or substantially collimated) image reaches the user. As noted above, a collimated (or substantially collimated) image has optical rays that are more parallel, as if the image had originated at a far distance from the user, tens to hundreds of meters for instance. In order to achieve such a surface, depending on the collimating power of the pixel lenses, the radius of curvature of the reflection region of the reflective optical surface corresponding to the "desired portion" of the at least one light-emitting surface (desired light-emitting pixel) may be kept to a radius on the order of (but greater than) one-half the distance from the reflection region to the actual "desired portion" of the light-emitting surface (actual pixel) on the display. More particularly, the radius will be on the order of one-half the apparent distance from the reflection region to the "desired portion" of the light-emitting surface when the "desired portion" is viewed through its associated pixel lens from the location of the reflection region.

Thus, in one embodiment, the inter-reflected-pixel normal vector from the pixel of concern to the adjacent pixels satisfies a relationship that allows them to establish a radius of curvature on the order of approximately one-half the length of the vector from the location of the reflected pixel on the reflective surface to the apparent location of the display pixel as seen through its associated pixel lens. Adjustments that affect this parameter include the size of the at least one light emitting surface and whether the at least one light emitting surface is curved.

FIG. 16 illustrates this embodiment. In order to control the radius of curvature of the region surrounding the pixel reflection so that a collimated (or substantially collimated) image reaches the user, two adjacent pixel reflecting regions, such as at the point of reflection 1540, are considered. More regions may be considered for better balance but two are sufficient. With reference to FIG. 16, two pixel reflective points 1540 and 1610 are shown with respect to two pixels, 1545 and 1615, respectively on display surface 1510. The surface normals at points 1540 and 1610 are calculated along with the angle between their directions. The radius of curvature is calculated knowing these angles and the distance between the points 1540 and 1610. Specifically, the surface configuration and, if needed, the surface's spatial location are adjusted until the radius of curvature is on the order of approximately one-half of the average of the lengths of beams 1515 and 1620 when those lengths are adjusted for the effects of the pixel lenses. In this way, zero or near-zero diopter light can be provided to the user's eye. As noted above, this is equivalent to light coming from a point essentially infinitely distant, and the light wavefront is flat, resulting in parallel surface normals to the light's wavefront.

In addition to controlling the local radii of curvature, in certain embodiments, as a first order point solution to having a collimated (or substantially collimated) image enter the eye, the at least one light emitting surface is nominally located a distance of one focal length away from the FS/UWA/RO surface, where the focal length is based on the average value of the radii of curvature of the various reflective regions making up the FS/UWA/RO surface.

The result of applying the Fermat and Hero principles is a set of reflective regions that may be combined into a smooth reflective surface. This surface will, in general, not be spherical or symmetric. FIG. 18 is a two dimensional representation of such a FS/UWA/RO surface 1520. As discussed above, surface 1520 may be constructed such that the radii of curvature at points 1710 and 1720 are set to values which, when combined with the collimating effects of the pixel lenses, provide for relaxed viewing of the image from the at least one light-emitting surface of the image display system which is being reflected by the surface. In this way, looking in a certain direction represented by line 1730 will provide a collimated (or substantially collimated) virtual image to the eye 1530, as will looking in a different direction represented by line 1740. To enable a smooth transition of viewing all across the field of view, the regions of the FS/UWA/RO surface may be smoothly transitioned from one control point to another, as may be performed by using Non-Uniform Rational B-Spline (NURBS) technology for splined surfaces, thus creating a smooth transition across the reflective surface. In some cases, the FS/UWA/RO surface may include a sufficient number of regions so that the surface becomes smooth at a fine grain level. In some embodiments, different magnifications for each portion of the display (e.g., each pixel) may be provided using a gradual gradient to allow better manufacturability, realization, and image quality.

From the foregoing, it can be seen that the overall head-mounted display can be designed using the following exemplary steps: determining a desired field of view, choosing a display surface size (e.g., width and height dimensions), choosing an orientation for the display surface relative to a reflective surface, choosing a candidate location for the pixel lenses between the display and the reflective surface, choosing a candidate configuration for the pixel lenses, cataloging the position of every pixel on the display surface as seen through the pixel lenses, and choosing a location for display of every pixel from the display surface on the reflective surface. The display surface and the pixel lenses can be placed above the eye and tilted toward the reflective surface, allowing the curvature of the reflective surface to reflect light to the eye of the wearer. In further embodiments, the display surface and pixel lenses may be placed in other positions, such as to the side of the eye or below the eye, with the reflective position and curvature selected to reflect the light from the display surface appropriately, or being tilted to a different degree.

In certain embodiments, a three-dimensional instantiation or mathematical representation of the reflective surface can be created, with, as discussed above, each region of the reflective surface being a local region having a normal that bisects the vectors from the center of that region to the center of the user's eye and to the center of a pixel in the display surface (center of the apparent position of the pixel resulting from the presence of the pixel lens associated with the pixel). As also discussed above, the radii of curvature of regions surrounding a pixel reflection can be controlled so that in combination with the collimating effects of the pixel lenses, a collimated (or substantially collimated) image reaches the user across the field of view. Through computer-based iterations, changeable parameters local normals, local curvatures, and local spatial locations of the reflective surface and the locations, powers, and structures of the pixel lenses) can be adjusted until a combination (set) of parameters is identified that provides a desired level of optical performance over the field of view, as well as a manufacturable design which is aesthetically acceptable.

During use, a non-symmetrical FS/UWA/RO surface (which, in certain embodiments, is constructed from a splined surface of multiple local regions of focus) in combination with the pixel lenses forms a virtual image of the at least one light emitting surface of the image display system that is stretched across a wide field of view. The FS/UWA/RO surface may be thought of as a progressive mirror or progressive curved beam splitter or a free-form mirror or reflector. As the eye scans across the field of view, both horizontally and vertically, the curved FS/UWA/RO surface shines different portions of the at least one light-emitting surface of the image display system into the user's eye. In various embodiments, the overall optical system is manufacturable in large quantities at low cost while maintaining an image quality commensurate with typical human visual resolution.

IV. HMDs that Employ a Non-Curved Reflective Optical Surface

Figure 19:
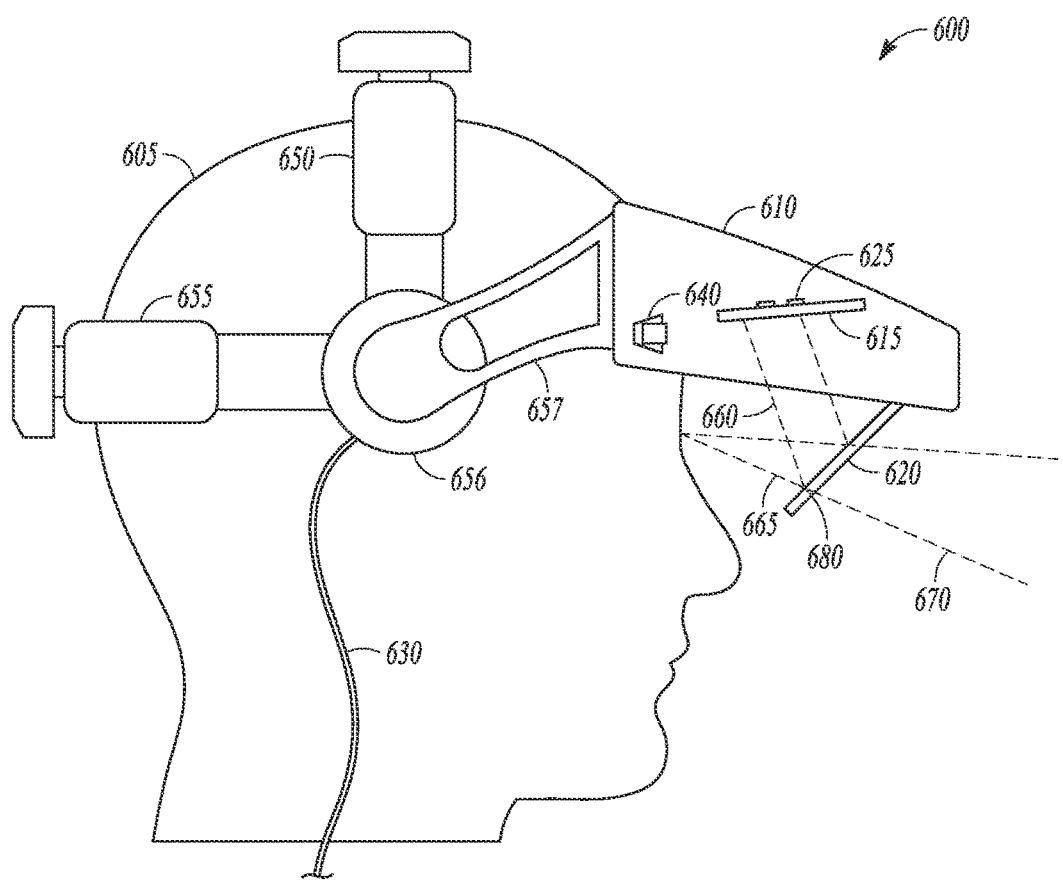
FIG. 19 is a side view of an alternative augmented-reality head-mounted display apparatus having pixel lenses according to an example embodiment.

FIG. 19 is a side view of an alternative head-mounted display apparatus 600. The head-mounted display apparatus 600 may be a pair of augmented-reality binocular viewers. The head-mounted display apparatus 600 includes a visor member 610 adapted to project or radiate from a wearer's face when worn by user 605. The visor member 610 is configured to support at least one display assembly 615 above the eyes of the user 605. For example, the at least one display assembly 615 may be horizontally disposed or at a slight angle with respect to the horizon. The at least one display assembly 615 has one pixel lens per light-emitting pixel included in the assembly. The head-mounted display apparatus 600 further includes a flat beam splitter lens system 620 oriented at a slight angle with respect to a vertical plane to reflect collimated or substantially collimated light from the at least one display assembly 615 to the eyes of the user 605. The head-mounted display apparatus 600 provides for near viewing and a wide field of view. The at least one display assembly 615 in this embodiment may have larger dimensions than in other embodiments to provide a wide field of view since in this embodiment there is no optical curvature in beam splitter 620.

An electronics package 625 controls the image that is displayed. Electronics package 625 may include accelerometers and gyroscopes in one embodiment. Power and video to and from the head-mounted display apparatus 600 can be provided through a transmission cable 630 or wireless medium where the electronics package 625 provides a transceiver or wired interface.

A set of cameras 640 may be situated on each side of the HMD to provide input to a functionality, such as a software or firmware module executing on electronics package 625, to control the computer generation of augmented reality scenes. Elements 650, 655, 656, and 657 represent various forms of support to hold the device 600 in a desired position relative to the eye, such as bands or cords which may be adjustable in some embodiments.

The operation of the system of FIG. 19 is illustrated by light rays 660, 665, and 670. As shown, light ray 670 enters from the environment through an exterior surface of the flat beam splitter lens system 620, acts combined with the light from the at least one display assembly 615 that hits the interior surface of the flat beam splitter lens system 620 to create the combined light ray 665 that enters the user's eye when the user looks in the direction of point 680. The user's peripheral vision capabilities also allow the user to see light further distant laterally and vertically from just around point 680, across the surface of the beam splitter lens system 620. The at least one display assembly 615 can be made to bend in a curved, cylindrical manner to allow better access to the pixel information by the optics system of the eye and beam splitter system 620.

V. Direct View HMDs

In addition to the above applications, pixel lenses can also be used for direct viewing of an image display system without an intervening reflective optical surface. Such a configuration will be immersive, but can include external world information through the use of one or more video cameras. By using pixel lenses, an image of a display can be projected into a wide field of view in a compact space.

Through the use of the pixel lenses, the user can see the image that is produced as if it came from a distance, allowing the user's eye to easily focus on it. Also, a maximum undistorted field of view is obtainable with this approach. The collimation of the beam is performed in the at least one display assembly itself, so no further collimation is needed. The user looks directly at least one screen in close proximity, and the at least one image display system can be made as large as needed to allow for the expected field of view. The pixel lenses allow viewing of the display system even when positioned close to the eye. Optimization may be performed by manipulating the display system curvature, pixel size, pixel lens properties, and distance from user's eyes to obtain the most useful package.

Figure 20:
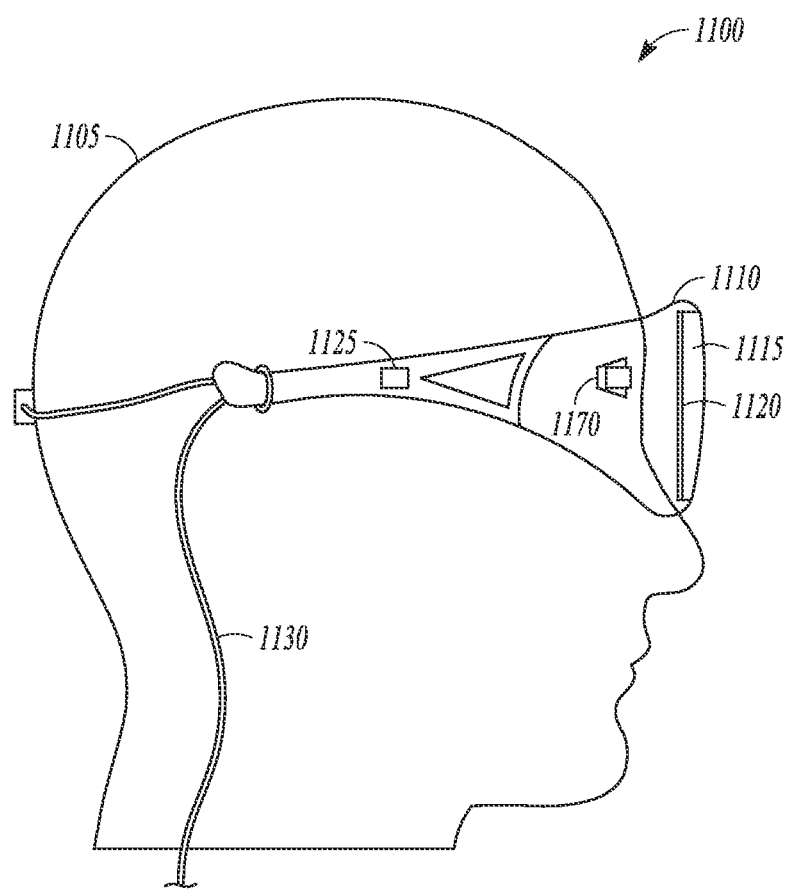
FIG. 20 is a side view of an immersive head-mounted display apparatus having pixel lenses according to an example embodiment.

FIG. 20 illustrates a head-mounted display apparatus 1100 being worn by a user 1105. The head-mounted display apparatus 1100 may be a pair of immersive binocular viewers 1110. The viewers 1110 may take a form similar to a glasses or goggles that support at least one display assembly 1115 with one pixel lens per each light-emitting pixel in the assembly. The at least one display assembly 1115 is positioned directly in the user's field of view and adjusted for near viewing with pixel lensing. The at least one display assembly 1115 is mounted to surfaces of the goggles or glasses directly in front of the user's eyes using, for example, support 1120, and oriented essentially vertically such that the pixels emanate light directly in the direction of the user's eyes for an immersive virtual world experience. An electronics package 1125 is provided that includes processing circuitry, accelerometers and gyroscopes supported by the frame in one embodiment to control the image being displayed. Power and video to and from the binocular viewers 1110 can be provided through a transmission cable 1130 or wireless medium. A set of cameras 1170 is situated one on each side of the HMD and supported by the frame to provide input to a software package, e.g., a software package which is part of electronics package 1125, to help control the computer generation of the immersive reality scenes.

Figure 21:
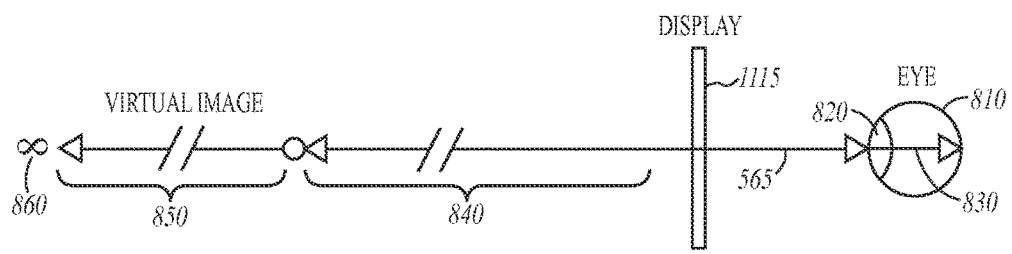
FIG. 21 is a ray diagram illustrating ray paths for an immersive head-mounted display apparatus having pixel lenses according to an example embodiment.

As seen in FIG. 21, wherein the reference numbers are the same for like elements of FIG. 20, the vision system of this embodiment consists of two parts: (a) at least one display assembly 1115 and (b) eye 810, which has an internal lens 820. Light emitted from a pixel of display assembly 1115 which has gone through the pixel's associated pixel lens is represented at 565. After going through the eye's lens 820, that light will appear at a point on the user's retina. What the eye sees, however, is a virtual image that appears in the space ahead of it, at a distance represented by vectors 840 and 850. For a virtual image at infinity 860, the ray distance is the sum of vectors 840 and 850. The at least one display assembly 1115 is shown as flat in this representation, but may be curved or flat.

Figure 22:
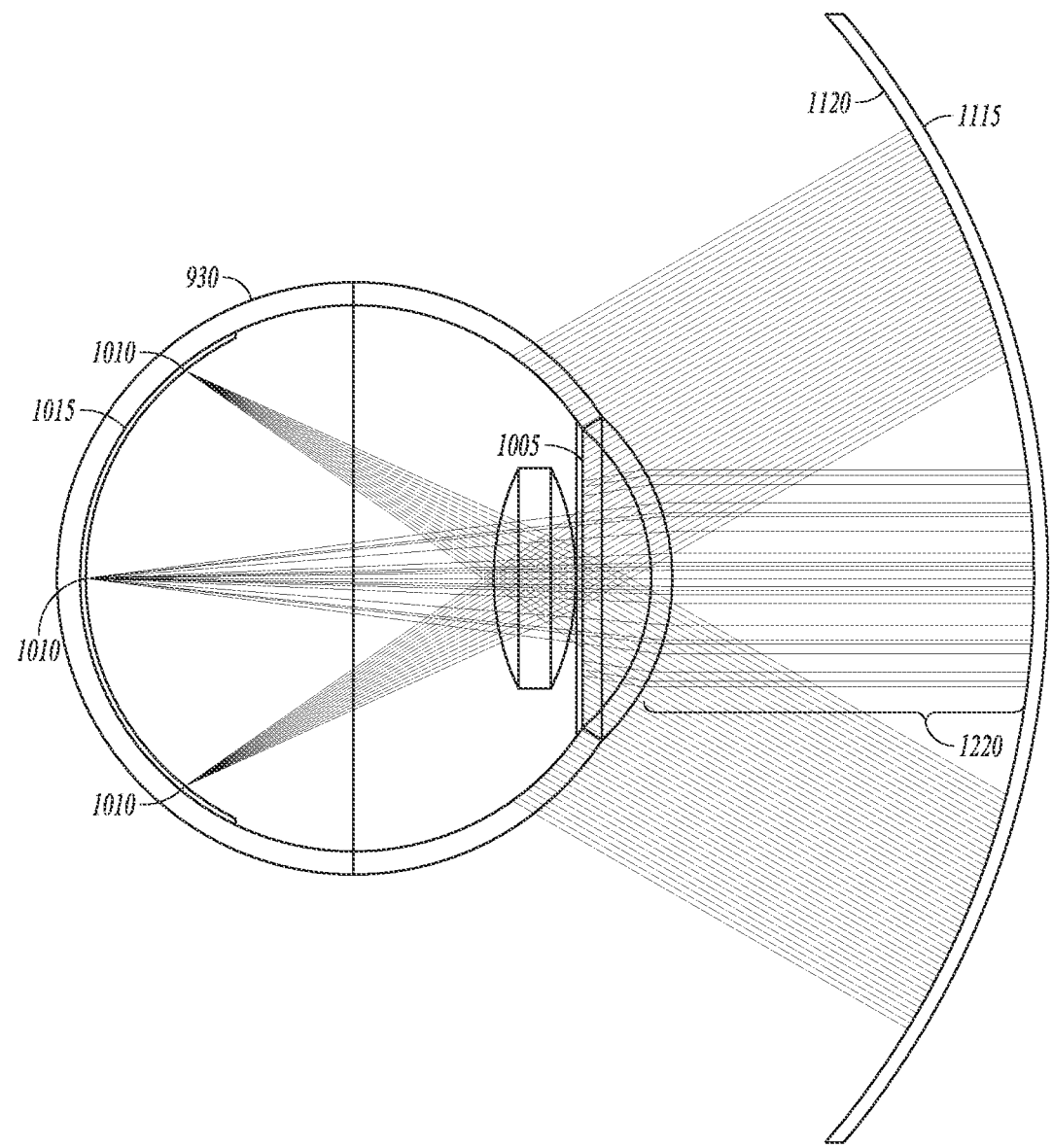
FIG. 22 is a diagram illustrating light paths for an immersive head-mounted display apparatus having pixel lenses according to an example embodiment.

FIG. 22 is a ray diagram illustrating light from a head-mounted display apparatus entering an eye 930. The light is shown emanating off of a display assembly 1115 having a curved arrangement. In particular, light is shown as emanating from three portions of outer surface 1120 of display assembly 1115. All of the pencils of light from the three portions, such as 1220 are collimated and able to be seen and focused upon by the eye 930 as seen at points 1010 on retina 1015.

VI. General Considerations

In terms of the overall structure of the HMD, Table 1 sets forth representative, non-limiting, examples of the parameters which a HMD display constructed in accordance with the present disclosure will typically meet. In addition, the HMD displays disclosed herein will typically have an inter-pixel distance that is small enough to ensure that a cogent image is established in the visual plane of the user.

Various features that can be included in the head-mounted displays disclosed herein include, without limitation, the following, some of which have been referenced above:

(1) In some embodiments, the reflective optical surface (when used) may be semi-transparent, allowing light to come in from the external environment. The internal display-generated images can then overlay the external image. The two images may be aligned through the use of localization equipment, such as gyroscopes, cameras, and software manipulation of the computer-generated imagery so that the virtual images are at the appropriate locations in the external environment. In particular, a camera, accelerometer, and/or gyroscopes can be used to assist the apparatus in registering where it is in the physical reality and to superimpose its images on the outside view. In these embodiments, the balance between the relative transmittance and reflectance of the reflective optical surface can be selected to provide the user with overlaid images with appropriate brightness characteristics. Using the correct balance of admitted light from the environment outside the HMD and internally generated light allows a reflection to be seen on an interior surface of the HMD that appears to be in the environment outside the glasses. Also in these embodiments, the real world image and the computer-generated image can appear to both be at approximately the same apparent distance, so that the eye can focus on both images at once.

(2) In some embodiments, the reflective optical surface (when used) is kept as thin as possible in order minimize effects on the position or focus of external light passing through the surface.

(3) In some embodiments, the head-mounted display apparatus provides a field of view to each eye of at least 100 degrees, at least 150 degrees, or at least 200 degrees.

(4) In some embodiments, the field of view provided by the head-mounted display apparatus to each eye does not overlap the user's nose by any large degree.

(5) In some embodiments, the reflective optical surface (when used) may employ a progressive transition of its optical prescription across the field of view to maintain focus on the available display area.

(6) In some embodiments, ray tracing may be used to customize apparatus parameters for a particular implementation, such as military training, flight simulation, gaming and other commercial applications.

(7) In some embodiments, the reflective optical surface (when used) and/or the surface of the display, as well as the properties and locations of the pixel lenses, and the distances between the display and the reflective optical surface when used) and between the reflective optical surface (when used) and the eye, can be manipulated with respect to a Modulation Transfer Function (MTF) specification at the retina and/or the fovea.

(8) In some embodiments, the HMDs disclosed herein can be implemented in applications such as, but not limited to, sniper detection, commercial training, military training and operations, and CAD manufacturing.

(9) Although shown as flat in the figures, the image display system may also have a curved light-emitting surface.

Once designed, the reflective optical surfaces disclosed herein (e.g., the FS/UWA/RO surfaces) can be produced e.g., manufactured in quantity, using a variety of techniques and a variety of materials now known or subsequently developed. For example, the surfaces can be made from plastic materials which have been metalized to be suitably reflective. Polished plastic or glass materials can also be used, with the exclusion of anti-reflective coatings on their reflective surface. For "augmented reality" applications, the reflective optical surfaces can be constructed from a transmissive material with embedded small reflectors thus reflecting a portion of an incident wavefront while allowing transmission of light through the material.

For prototype parts, an acrylic plastic (e.g., plexiglas) may be used with the part being formed by diamond turning. For production parts, either acrylic or polycarbonate may, for example, be used with the part being formed by, for example, injection molding techniques. The reflective optical surface may be described as a detailed Computer Aided Drafting (CAD) description or as a non-uniform rational B-Spline NURBS surface, which can be converted into a CAD description. Having a CAD file may allow the device to be made using 3-D printing, where the CAD description results in a 3D object directly, without requiring machining.

The mathematical techniques discussed above can be encoded in various programming environments and/or programming languages, now known or subsequently developed. A currently preferred programming environment is the Java language running in the Eclipse Programmer's interface. Other programming environments such as Microsoft Visual C# can also be used if desired. Calculations can also be performed using the Mathcad platform marketed by FTC of Needham, Mass., and/or the Matlab platform from MathWorks, Inc., of Natick, Mass. The resulting programs can be stored on a hard drive, memory stick, CD, or similar device. The procedures can be performed using typical desktop computing equipment available from a variety of vendors, e.g., DELL, HP, TOSHIBA, etc. Alternatively, more powerful computing equipment can be used including "cloud" computing if desired.

From the foregoing, it can be seen that in various embodiments, a high resolution and wide field of view (wide angle) display in an HMD device similar to sunglasses has been provided. The wide field of view can, for example, be made to any angle desired by having bigger and/or more displays. The displayed image can be overlaid on viewed physical reality of a surrounding environment. The use of pixel lenses allows the user's eye to be in close proximity to the HMD's screen while focusing on the distant scene, and the imagery from the screen appears to also be distant. The HMD establishes and maintains a fixed relationship between the image display system, the pixel lenses, and the user's eyes. The pixel intensity may be individually controlled based on the distance of the image display system to the user's eyes or for embodiments that employ a beam splitter, based on the distance of the image display system to the beam splitter, the curvature of the beam splitter, and the distance of the beam splitter to the user's eye.

In various embodiments, apparatus and methods are characterized in that: (i) the reflective optical surface (when used) and the array of pixel lenses produce spatially-separated virtual images of spatially-separated portions of the light-emitting surface, at least one of the spatially-separated virtual images being angularly separated from at least one other of the spatially-separated virtual images by at least 100 degrees (in some embodiments, at least 150 degrees and, in other embodiments, at least 200 degrees), the angular separation being measured from the center of rotation of a nominal user's eye; and (ii) at least one point of the reflective optical surface is angularly separated from at least one other point of the reflective optical surface by at least 100 degrees (in some embodiments, at least 150 degrees and, in other embodiments, at least 200 degrees), the angular separation being measured from the center of rotation of a nominal user's eye. For these embodiments, during use, the at least one of the spatially-separated virtual images can be located along a direction of gaze which passes through the at least one point of the reflective optical surface and the at least one other of the spatially-separated virtual images is located along a direction of gaze which passes through the at least one other point of the reflective optical surface.

In various embodiments, a separate array of pixel lenses, a separate image display system, and/or a separate reflective optical surface (when used) is employed for each of the user's eyes. In other embodiments, the reflective optical surface (when used) contributes to the collimation (or substantial collimation) of the light from the image display system provided by the array of pixel lenses, such contribution to the collimation (or substantial collimation) being achieved through the surface's local radii of curvature.

In various embodiments, the HMD apparatus may be a binocular non-pupil-forming system in which the eye is free to move about its rolling center throughout its normally obtainable angular extents without being constrained to look through an external pupil. Prior HMD devices have alleged that they have or can provide a wide field of view, but these devices have included an external pupil that the eye must look through. Although there is a wide amount of information provided to the eye, if the eye turns the information is gone. This is the fundamental problem with pupil-forming systems which is avoided in embodiments of the present disclosure which employ reflective surfaces and, in particular, FS/UWA/RO surfaces.

A variety of modifications that do not depart from the scope and spirit of the invention will be evident to persons of ordinary skill in the art from the foregoing disclosure. The following claims are intended to cover the specific embodiments set forth herein as well as modifications, variations, and equivalents of those embodiments.

TABLE 1

| Name | Description | Units | Minimum | Maximum |
|---|---|---|---|---|
| Distance of reflective surface from eye | | mm | 10 | 400 |
| Distance of reflective surface from display | | mm | 10 | 400 |
| Display size | Horizontal | mm | 9 | 100 |
| | Vertical | mm | 9 | 100 |
| Display resolution | Horizontal | pixels | 640 | 1920+ |
| | Vertical | pixels | 480 | 1080+ |
| HMD weight | | grams | 1 | 1000 |
| HMD size | Distance in front of face | mm | 10 | 140 |
| Human pupil size | | mm | 3 to 4 | 5 to 9 |
| Size of reflective surface | e.g., less than the width of the head/2 | mm | 30 | 78 |
| Number of reflective surfaces | | units | 1 | 3+ |

TABLE 1-continued

| Name | Description | Units | Minimum | Maximum |
|---|---|---|---|---|
| Maximum illumination to the eye | e.g., bright enough to allow viewing on bright sunny day | fc, foot-candles | 5,000 | 10,000 |
| Battery life | | hours | 3 | 4 |
| Optical resolution | Largest, angular blur | arcminute RMS blur diameter | 1 | 10 |
| | Estimated number of line pairs of resolution | Line pairs/mm at the fovea | 20 | 140 |
| Maximum variation in apparent brightness of the image | | Percent | 0 | 20 |
| Maximum image distortion | | Percent | 0 | 5 |
| Estimated maximum derivative of brightness | | Percent/degree | 0 | 5 |

What is claimed is:

1. A head-mounted display apparatus comprising:
a frame adapted to be mounted on a nominal user's head;
a display assembly comprising:
an image display system having a light-emitting surface which comprises an array of light-emitting pixels; and
an array of pixel lenses;
said display assembly being supported by the frame;
a reflective optical surface supported by the frame; and
the array of pixel lenses facing the reflective optical surface and having a different one pixel lens for each light-emitting pixel of the array of light-emitting pixels, said one pixel lens being aligned with and configured to receive light from its associated light-emitting pixel wherein the array of pixel lenses either alone or in combination with the reflective optical surface is configured to collimate or substantially collimate the light emitted from the array of light-emitting pixels, wherein the display assembly is convexly curved towards the reflective optical surface and is supported by the frame at a position that is outside a light path from the reflective optical surface to an eye of the nominal user.

2. The head-mounted display apparatus of claim 1 wherein the reflective optical surface is flat and the array of pixel lenses alone is configured to collimate or substantially collimate the light emitted from the array of light-emitting pixels.

3. The head-mounted display apparatus of claim 1 wherein the reflective optical surface is curved and the array of pixel lenses and the reflective optical surface in combination are configured to collimate or substantially collimate the light emitted from the array of light-emitting pixels.

4. The head-mounted display apparatus of claim 1 wherein the reflective optical surface is a continuous surface that is not rotationally symmetric about any coordinate axis of a three-dimensional Cartesian coordinate system.

5. The head-mounted display apparatus of claim 1 wherein:
the reflective optical surface and the array of pixel lenses produce different spatially-separated virtual images of spatially-separated portions of the light-emitting surface, at least one of the spatially-separated virtual images being angularly separated from at least one other of the spatially-separated virtual images by an angular separation of at least 100 degrees, said angular separation being measured from the center of rotation of the eye of the nominal user.

6. The head-mounted display apparatus of claim 5 wherein:
the at least one of the spatially-separated virtual images is angularly separated from the at least one other of the spatially-separated virtual images by at least 150 degrees; and
the at least one point of the reflective optical surface is angularly separated from the at least one other point of the reflective optical surface by at least 150 degrees.

7. The head-mounted display apparatus of claim 5 wherein:
the at least one of the spatially-separated virtual images is angularly separated from the at least one other of the spatially-separated virtual images by at least 200 degrees; and
the at least one point of the reflective optical surface is angularly separated from the at least one other point of the reflective optical surface by at least 200 degrees.

8. The head-mounted display apparatus of claim 1 wherein the reflective optical surface is semi-transparent.

9. A head-mounted display apparatus comprising:
a frame adapted to be mounted on a user's head;
an image display system having a light-emitting surface which comprises an array of light-emitting pixels, said image display system being supported by the frame;
a free-space, ultra-wide angle, reflective optical surface supported by the frame; and
an array of pixel lenses located between the array of light-emitting pixels and the free-space, ultra-wide angle, reflective optical surface, the array having a different one pixel lens for each light-emitting pixel of the array of light-emitting pixels, each said one pixel lens being aligned with and configured to receive light from its associated light-emitting pixel wherein the free-space, ultra-wide angle, reflective optical surface and the array of pixel lenses produce different spatially-separated virtual images of spatially-separated portions of the light-emitting surface, at least one of the spatially-separated virtual images being angularly separated from at least one other of the spatially-separated virtual images by an angular separation of at least 100 degrees, the angular separation being measured from a center of rotation of a nominal user's eye.

10. The head-mounted display apparatus of claim 9 wherein the array of pixel lenses in combination with the free-space, ultra-wide angle, reflective optical surface collimates or substantially collimates the light emitted from the array of light-emitting pixels.

11. The head-mounted display apparatus of claim 9 wherein the array of pixel lenses alone collimates or substantially collimates the light emitted from the array of light-emitting pixels.

12. The head-mounted display apparatus of claim 9 wherein the at least one of the spatially-separated virtual images is angularly separated from the at least one other of the spatially-separated virtual images by at least 150 degrees.

13. The head-mounted display apparatus of claim 9 wherein the at least one of the spatially-separated virtual images is angularly separated from the at least one other of the spatially-separated virtual images by at least 200 degrees.

14. The head-mounted display apparatus of claim 9 wherein the free-space, ultra-wide angle, reflective optical surface is semi-transparent.

15. A method comprising the steps of:
generating an image by a display assembly comprising an image display system having a light-emitting surface which comprises an array of light-emitting pixels, and an array of pixel lenses, the display assembly being convexly curved towards a reflector and being supported by a frame at a position that is outside a light path from the reflector to an eye of a user;
independently collimating or substantially collimating light from each respective one light-emitting pixel of the array of light-emitting pixels by a different respective one pixel lens of the array of pixel lenses aligned with the array of light-emitting pixels;
providing the collimated or substantially collimated light from the array of pixel lenses to a reflector positioned relative to the eye of the user; and
reflecting the collimated or substantially collimated light from the reflector to the eye of the user.

16. The method of claim 15 wherein the reflector comprises a beam splitter and the method further comprises passing external light through the reflector to provide a view of an environment external to the reflector to the eye of the user.

\* \* \* \* \*

UNITED STATES PATENT AND TRADEMARK OFFICE
CERTIFICATE OF CORRECTION

PATENT NO. : 9,720,228 B2  
APPLICATION NO. : 13/327217  
DATED : August 1, 2017  
INVENTOR(S) : Gregory A. Harrison et al.

Page 1 of 1

It is certified that error appears in the above-identified patent and that said Letters Patent is hereby corrected as shown below:

In the Claims

On Column 31, Lines 12-16, replace:
"independently collimating or substantially collimating light from each respective one light-emitting pixel of the array of light-emitting pixels by a respective one pixel lens of the array of pixel lenses aligned with the array of light-emitting pixels;" with --"independently collimating or substantially collimating light from each respective one light-emitting pixel of the array of light-emitting pixels by a different respective one pixel lens of the array of pixel lenses aligned with the array of light-emitting pixels;"--.

Signed and Sealed this  
Twenty-sixth Day of November, 2019

Andrei Iancu  
*Director of the United States Patent and Trademark Office*